US012576754B2

(12) United States Patent
Quast et al.

(10) Patent No.: US 12,576,754 B2
(45) Date of Patent: Mar. 17, 2026

(54) SLIDING BLOCK FOR A PAIR OF SEAT RAILS, AND VEHICLE SEAT

(71) Applicant: Adient US LLC, Plymouth, MI (US)

(72) Inventors: Ingo Quast, Düsseldorf (DE); Erik Sprenger, Wermelskirchen (DE); Jürgen Krebs, Rockenhausen (DE)

(73) Assignee: Adient US LLC, Plymouth, MI (US)

( * ) Notice: Subject to any disclaimer, the term of this patent is extended or adjusted under 35 U.S.C. 154(b) by 0 days.

(21) Appl. No.: 18/580,640

(22) PCT Filed: Jul. 19, 2022

(86) PCT No.: PCT/IB2022/056627
§ 371 (c)(1),
(2) Date: Jan. 19, 2024

(87) PCT Pub. No.: WO2023/002356
PCT Pub. Date: Jan. 26, 2023

(65) Prior Publication Data
US 2024/0317117 A1      Sep. 26, 2024

(30) Foreign Application Priority Data

Jul. 22, 2021    (DE) ..................... 10 2021 207 865.6
Dec. 22, 2021    (DE) ..................... 10 2021 214 947.2

(51) Int. Cl.
*B60N 2/00*          (2006.01)
*B60N 2/07*          (2006.01)
*B60N 2/075*         (2006.01)

(52) U.S. Cl.
CPC ......... *B60N 2/0722* (2013.01); *B60N 2/0705* (2013.01); *B60N 2/0715* (2013.01); *B60N 2/075* (2013.01)

(58) Field of Classification Search
None
See application file for complete search history.

(56) References Cited

U.S. PATENT DOCUMENTS 7,604,214 B2 *  10/2009  Kojima ................ B60N 2/0825
                                                248/430
10,596,924 B2 *  3/2020  Sprenger ................ B60N 2/075
                              (Continued)

FOREIGN PATENT DOCUMENTS

DE          2547887 A1    4/1977
DE          2549711 A1    5/1977
                (Continued)

OTHER PUBLICATIONS

European Patent Office, International Search Report and Written Opinion in Application No. PCT/IB2022/056627, dated Sep. 20, 2022, 13 pages, Rijswijk, Netherlands.
(Continued)

*Primary Examiner* — Steven M Marsh
(74) *Attorney, Agent, or Firm* — Marshall & Melhorn, LLC

(57) ABSTRACT

A sliding block for a pair of rails of a longitudinal adjusting mechanism may have a base which has a lower sliding surface and an upper sliding surface. At least the upper sliding surface, along its longitudinal extent, may have alternating contact regions and/or parts of the upper sliding surface having one contact region each. Two pairs of the rails may be used with a vehicle seat.

12 Claims, 23 Drawing Sheets

(56)  References Cited

U.S. PATENT DOCUMENTS

| | | | | |
|---|---|---|---|---|
| 11,173,809 B2* | 11/2021 | Imamura | ............ | B60N 2/02246 |
| 11,479,150 B2* | 10/2022 | Sprenger | ............ | B60N 2/02258 |
| 2002/0060281 A1* | 5/2002 | Okazaki | ............... | B60N 2/0705 |
| | | | | 248/424 |
| 2009/0314916 A1* | 12/2009 | Kojima | ................ | B60N 2/0881 |
| | | | | 296/65.13 |
| 2016/0059108 A1 | 3/2016 | Demolder | | |
| 2023/0256872 A1* | 8/2023 | Kuroda | ................ | B60N 2/0705 |
| | | | | 248/429 |

FOREIGN PATENT DOCUMENTS

| | | | |
|---|---|---|---|
| DE | 4308015 A1 | 9/1994 |
| DE | 102016217945 B3 | 10/2017 |
| EP | 0685358 A1 | 12/1995 |
| EP | 2985174 A1 | 2/2016 |
| EP | 3683092 A1 | 7/2020 |
| WO | 2016059108 A1 | 4/2016 |

OTHER PUBLICATIONS

German Patent and Trademark Office, Office Action in Application No. DE10 2021 214 947.2, dated Mar. 23, 2022, 7 pages.

\* cited by examiner

SLIDING BLOCK FOR A PAIR OF SEAT RAILS, AND VEHICLE SEAT

The invention relates to a sliding block for a pair of seat rails, and to a pair of seat rails, and to a vehicle seat.

FIELD

Background

The prior art includes seat rail systems which use balls to support a longitudinal adjustment mechanism for the longitudinal adjustment of one of the rail profiles relative to another rail profile. Here, balls have low longitudinal displacement forces on account of low rolling friction. The disadvantage here is that the rolling of the balls changes their longitudinal position relative to the rail profiles during the longitudinal adjustment. The longer the longitudinal adjustment travels, the greater is this rolling travel. Allowance must be made for the rolling travel, and this reduces the possible support spacing of the balls. As a result, adjustment travels greater than 350 mm are not possible.

Another disadvantage is what is referred to as "brinelling" by the balls into the rail material under a high load. As a result, the balls may make impressions in the tracks of the rail profiles. During subsequent adjustment, these impressions are perceptible to the occupant from the unevenness of the displacement force. Moreover, after a prolonged period in which the seat position is unchanged, the force required for the first adjustment process may be significantly increased, and this is felt to be inconvenient.

DE 10 2016 217 945.4, for example, discloses sliding blocks which are designed to be fixed to the lower rail and are thus significantly longer than the upper rail profiles.

Moreover, balls are installed in the upper tracks to ensure that the displacement forces of the rails do not rise too much on account of tolerances.

WO 2016/059108 A1 discloses sliding elements as separate components, which consist of two parts and dissimilar materials. During assembly, this leads to the problem that the individual sliding elements may be damaged during the assembly of the rail system.

The problem addressed by the present invention is that of specifying an improved sliding block for a sliding mechanism for a pair of seat rails, in which mechanism plastic deformations ("brinelling") are largely avoided. The intention is furthermore to specify a pair of seat rails having an improved sliding block, e.g. a sliding bearing, and a vehicle seat having an improved pair of seat rails.

In respect of the sliding block, and the vehicle seat, the problem is solved according to the invention by the specified features in the claims described herein.

SUMMARY

The sliding block according to the invention comprises at least one base part, which has a lower sliding surface and an upper sliding surface, wherein at least the upper sliding surface has a respective alternating and/or region-wise contact region along its longitudinal extent.

The sliding block can be arranged in a track formed between two rails, for example a lower rail and an upper rail, in particular a floor rail and a seat rail.

In this case, the sliding block can contact the rails in a lower track by means of the lower sliding surface, and can contact the rails in an upper track by means of the upper sliding surface. The lower track and the upper track can extend in the longitudinal direction of the rails. The lower track and the upper track can be connected to one another.

The lower sliding surface can be of rigid design, at least in some region or regions. In addition or as an option, the lower sliding surface can have contact regions arranged in an alternating manner. At least the upper sliding surface has alternately arranged contact regions. In the upper track, the contact regions alternately contact the upper rail and the lower rail.

By virtue of the fact that the contact regions are arranged alternately or in an alternating manner, they can be made elastic. It is thereby possible to compensate for tolerances. For example, the upper sliding surface can have a first, e.g. upper, contact region and a second, e.g. lower, contact region. Their arrangement alternates in the longitudinal direction of the rails.

In order to ensure the preloading of the contact regions even over the service life and during temperature fluctuations, an additional spring element can be introduced. The spring element can be formed from a spring steel wire or from a flat strip of spring steel sheet, for example.

The advantages achieved by means of the invention consist, in particular, in the fact that the sliding mechanism is formed without balls, and therefore plastic deformations are reliably avoided. Moreover, the sliding mechanism is of particularly simple construction and inexpensive. Such a sliding mechanism in the form of a sliding block allows a large supporting length and is easy to assemble. Moreover, long adjustment travels of the pair of seat rails are made possible.

One of the sliding surfaces can be designed to be of rigid design and the other sliding surface can be designed to differ in rigidity and/or flexibility from region to region.

By means of the sliding block, a sliding mechanism is formed which comprises at least one base part, which extends substantially in the longitudinal direction and, in the vertical direction, has a lower sliding surface and an upper sliding surface, wherein the lower sliding surface is of rigid design and the upper sliding surface is designed to differ in rigidity and/or flexibility from region to region.

Owing to the differing rigidity and/or elasticity of the upper sliding surface, the sliding block can make contact region-wise in the upper track of a pair of seat rails, in particular in an alternating manner or alternately, by means of an upper rail or lower rail of the pair of seat rails.

The differing rigidity and/or elasticity are/is achieved by means of the shape and configuration of the upper sliding surface.

For example, the upper sliding surface has different material regions and/or differently shaped regions.

In another embodiment, the base part and the sliding surfaces are designed as an integral sliding body, sliding bearing or sliding mechanism.

In another embodiment, the lower sliding surface is designed, at least in some region or regions, as a solid body region and/or in the form of a profile. The lower sliding surface forms a rigid, in particular stable and robust, supporting surface for the sliding block. Viewed in a cross section, the lower sliding surface forms a substantially round, oval or completely spherical, e.g. circular or sphere-shaped, surface, at least in some section or sections. The lower sliding surface is provided to contact and support rail profiles of a pair of rails in a plurality of regions. A solid-body region denotes a surface that is, for example, filled with a material, in particular a low friction plastic, e.g. polyoxymethylene (POM). Alternatively or as an option, the lower sliding surface can additionally be designed as a hollow body in some region or regions.

In another embodiment, the lower sliding surface is of segmented design and comprises a number of mutually spaced recesses. The recesses are cut regions and/or stamped regions, for example. The recesses serve to save material. For example, a very largely weight-reduced sliding block is thereby produced.

In another embodiment, the lower sliding surface has two contact regions, at least in a first sliding section. For example, the contact regions extend along a longitudinal extent of the lower sliding surface. If the lower sliding surface comprises recesses, the segments between the recesses form sliding sections. The sliding sections form solid-body regions and/or regions in the form of profiles. The sliding sections or segments are of fully circular design. The sliding sections can also comprise a plurality of contact regions, which are formed by a circumference of a circle.

The sliding sections are formed by cylindrical segments, for example. The at least two contact regions are defined by a lateral surface of the respective sliding section or segment.

In another embodiment, the upper sliding surface is designed, at least in some region or regions, partially as a solid body region. When viewed in cross section, the upper sliding surface forms a semicircular surface. A solid-body region denotes a surface that is, for example, filled with a material, in particular a low friction plastic, e.g. polyoxymethylene (POM). For example, the upper sliding surface comprises at least one sliding section which, when viewed in cross section, is designed as a semicircular or crescent-shaped or hemispherical or half-cylindrical surface. Alternatively or as an option, the upper sliding surface can additionally be designed partially as a hollow body in some region or regions.

In another embodiment, the upper sliding surface has, in an alternating manner and/or region-wise, just one contact region along its longitudinal extent. The alternating contact regions of the sliding block with an upper rail or lower rail enable the sliding surfaces to be made elastic. It is thereby possible to compensate for tolerances. The contact regions are formed by rounded or bent surfaces of the sliding sections, which are designed as semicircles and are, in particular, shaped. In an alternating manner and/or region-wise, the upper sliding surface comprises a contact region which is oriented substantially upward and a contact region which is oriented substantially downward. For example, the upper sliding surface comprises at least two contact regions which are arranged offset by 180° with respect to one another.

Here, the sliding block acts as a sliding bearing, which can be subjected to high loads without being impaired by brinelling, which can occur in the case of high loads on rolling bearings, for example.

A sliding block according to the invention is designed as a separate component for rail systems that can be used in various ways. The sliding block is a profile component, in particular a C-shaped profile component.

The contact region of the upper sliding surface is formed by the partially formed solid-body region. In particular, the contact region is formed by an outer circumferential surface of a semicircular solid-body region.

In another embodiment, the sliding block comprises two sliding block bars, which are arranged one above the other in the vertical direction. The sliding block bars each form the sliding surfaces. The sliding block bars extend in the direction of longitudinal extent. The sliding block bars are connected to one another, for example, via the base part, which forms a middle section or central connecting section. The support of the upper rail on the sliding block bars or the sliding surfaces thereof reduces friction between the upper rail and the sliding block compared with large-area support of the upper rail on the sliding block.

In another embodiment, the sliding block bars and the base part are of integral design. For example, the sliding block bars and the base part are manufactured from one piece and/or material, in particular from the same piece and/or material. The sliding block is an injection molding, for example. The upper sliding block bar comprises alternating contact regions. For example, the upper sliding block bar comprises a number of semicircular sliding sections.

In another embodiment, the upper sliding surface is provided with an additional spring element, at least in some region or regions. It is thereby possible to ensure the preloading of the relevant contact region even over the service life and during temperature fluctuations. The spring element can be formed from a spring steel wire or a spring steel sheet, for example, in particular a flat strip of spring steel sheet.

In respect of a pair of seat rails for a longitudinal adjustment mechanism, the problem is solved according to the invention by the fact that the pair of rails comprises at least two rail profiles and at least one sliding block described above.

In respect of another pair of seat rails, the problem is solved according to the invention by the fact that the pair of rails comprises at least two rail profiles and one or two of the sliding blocks, wherein the respective sliding block comprises at least one base part, which has a lower sliding surface and an upper sliding surface, wherein one of the sliding surfaces has, along its longitudinal extent, contact regions, which are arranged in an alternating manner and/or region-wise, are each assigned to one of the two rail profiles, and contact one of the two rail profiles. As a result, one sliding surface, e.g. the upper sliding surface, is very largely of flexible and/or elastic design. The contact regions are formed by sliding sections. The sliding sections or contact regions support or contact both rail profiles, unlike conventional spherical rolling elements. The sliding sections or contact regions are of semi-circular or hemispherical design and can be moved in a substantially flexible and/or elastic manner in the direction of the rail profile which is not being contacted. In the assembled state, one contact region is in contact with the associated rail profile and is at a distance from the other rail profile.

One of the rail profiles is coupled movably via the two sliding blocks to the other rail profile and can be adjusted relative to the other rail profile. The sliding surfaces are each arranged in an upper and lower track.

In another embodiment of the pair of rails, the lower sliding surface has two contact regions, which each contact one of the two rail profiles, in particular contact them simultaneously.

In a first embodiment, the length of the respective sliding block can extend along the total length of an upper rail profile. Alternatively, the respective sliding block can be designed to be shorter than the upper rail profile. In the case where it is formed over the total length of the upper rail profile, the respective sliding block is fixed relative to the upper rail profile, in particular fixed against adjustment, and a longitudinal movement takes place only relative to the lower rail. Such an embodiment has the greatest supporting length, wherein the lower rail profile also surrounds the upper rail profile in the forwardmost and rearmost longitudinal set profile. If the sliding block is shorter than the upper rail profile, a relative movement can take place between the sliding block and the upper rail profile. As a result, the length of the lower rail or the lower rail profile can be made shorter since the upper rail or the upper rail profile can move out of the lower rail or the lower rail profile.

The alternate contact regions of the upper sliding surfaces can furthermore have insertion bevels in order to allow simple assembly of the pair of seat rails.

A vehicle seat according to the invention comprises two of the above-described pairs of seat rails, which, in particular, are arranged parallel to one another, wherein a respective upper rail profile is firmly connected to one seat part of the vehicle seat.

DESCRIPTION OF THE FIGURES

Illustrative embodiments of the invention are explained in greater detail by means of drawings. In the drawings.

6

Figure 23:
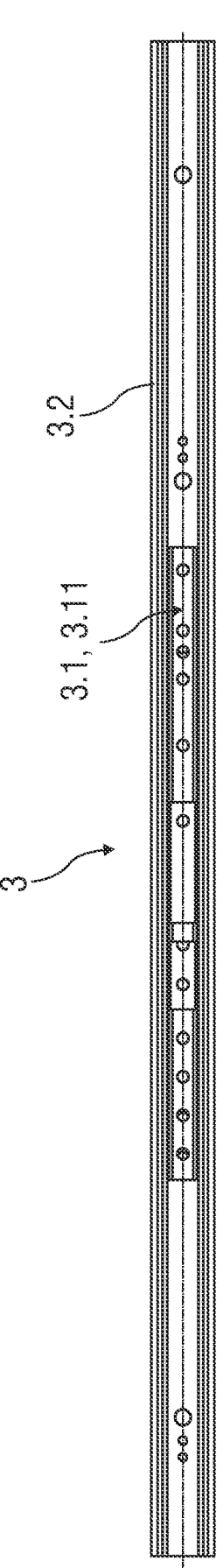
Figures 24, 25, 26:
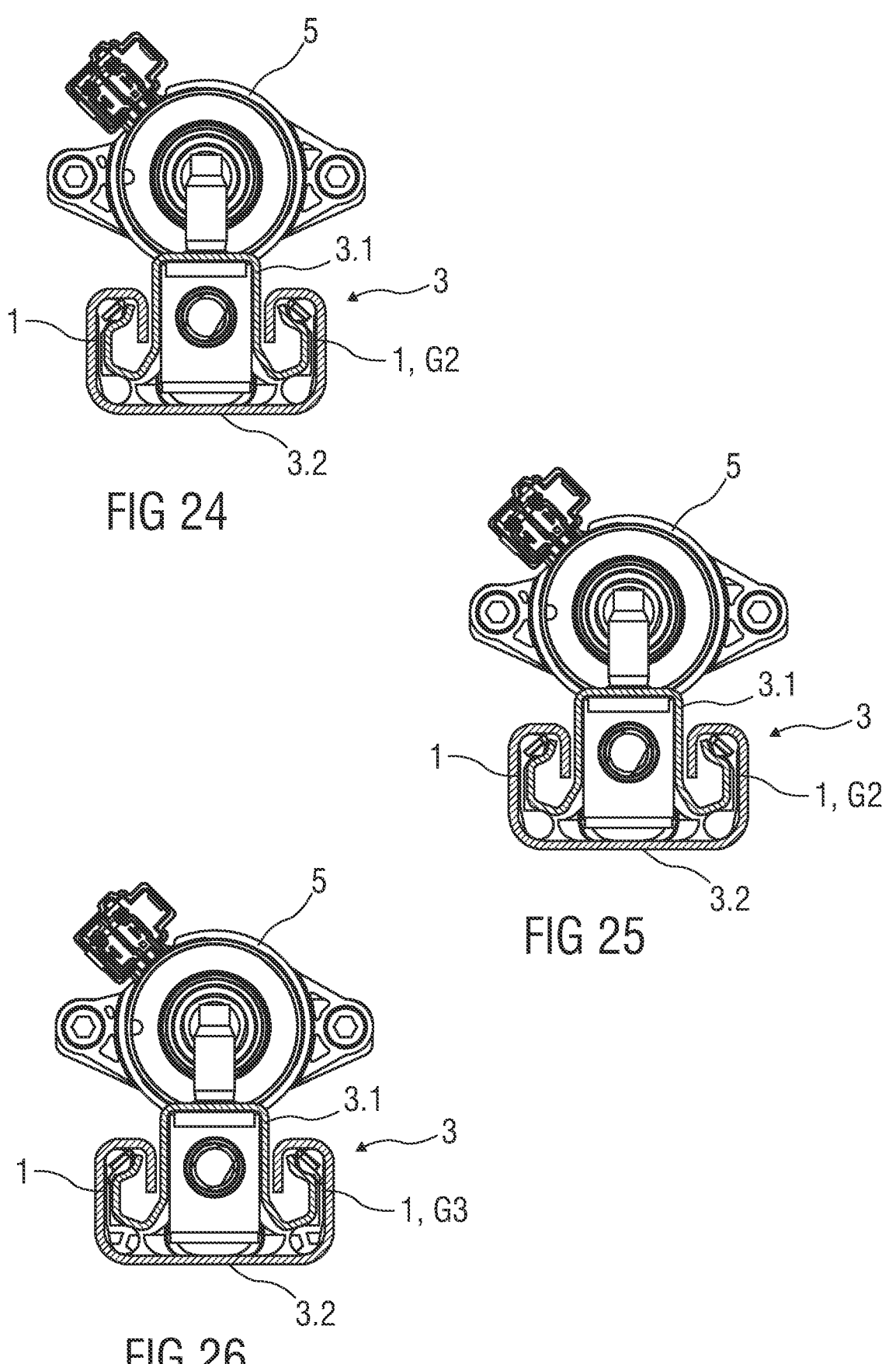
Figure 27:
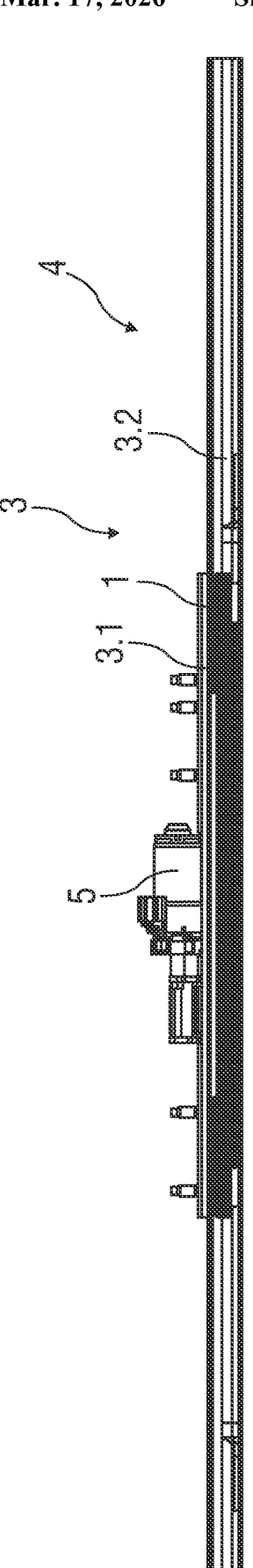
Figure 28:
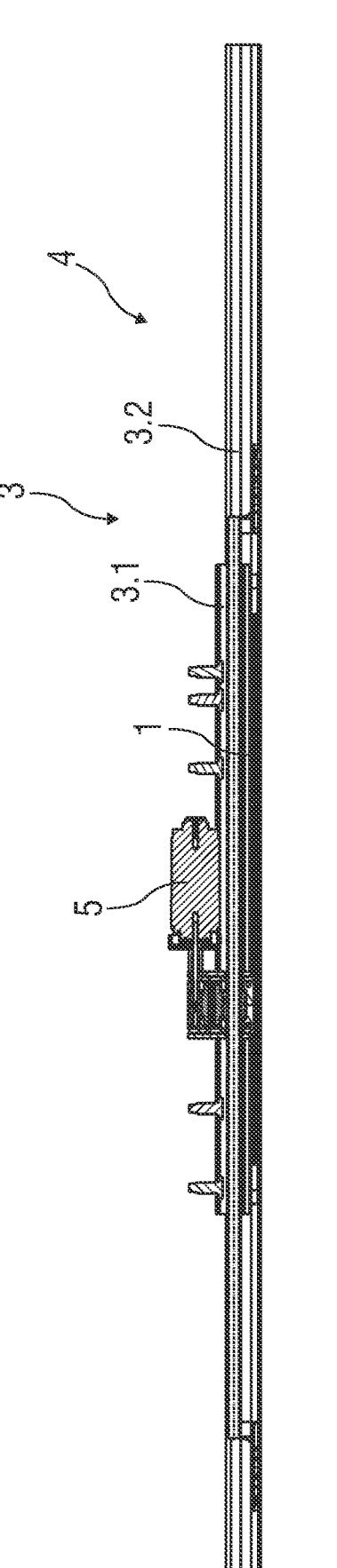
Figure 29:
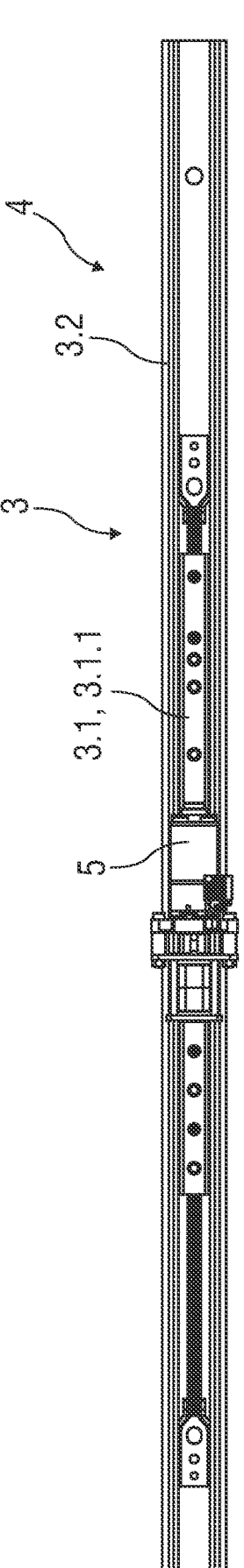
Figure 30:
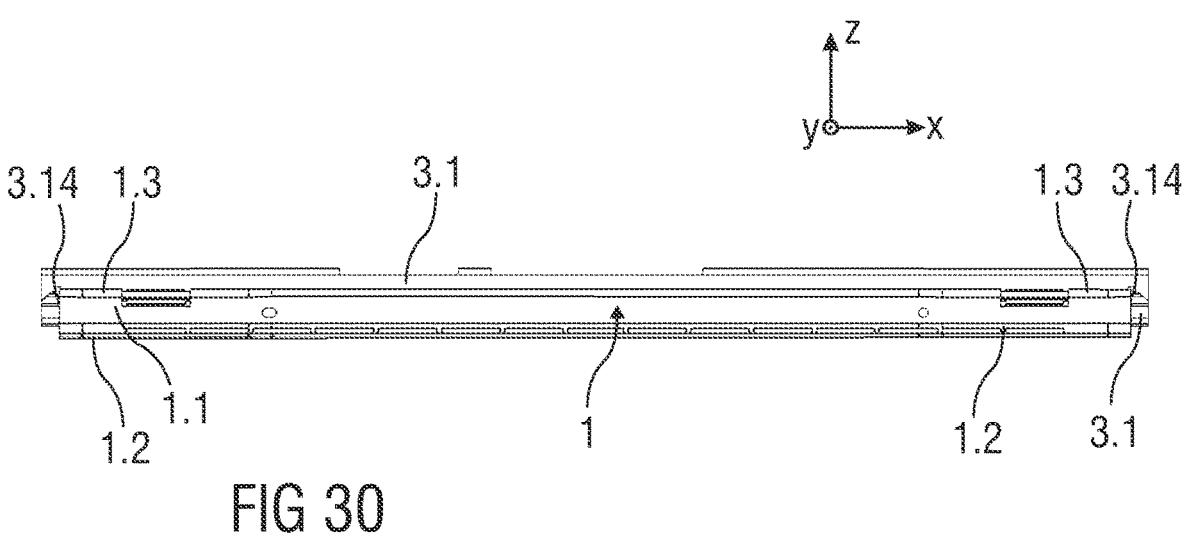
Figure 31:
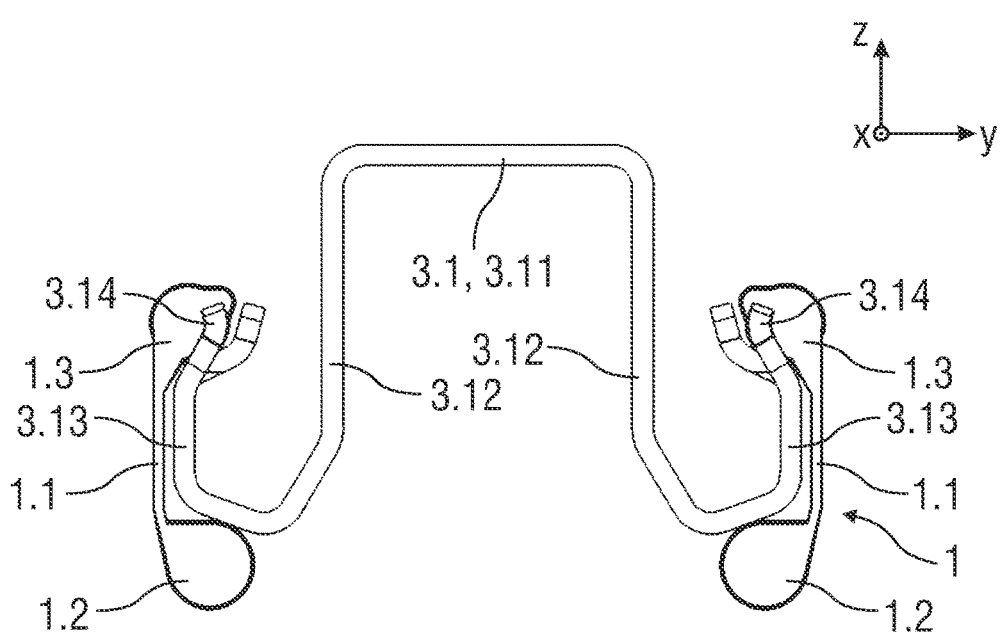
Figure 32:
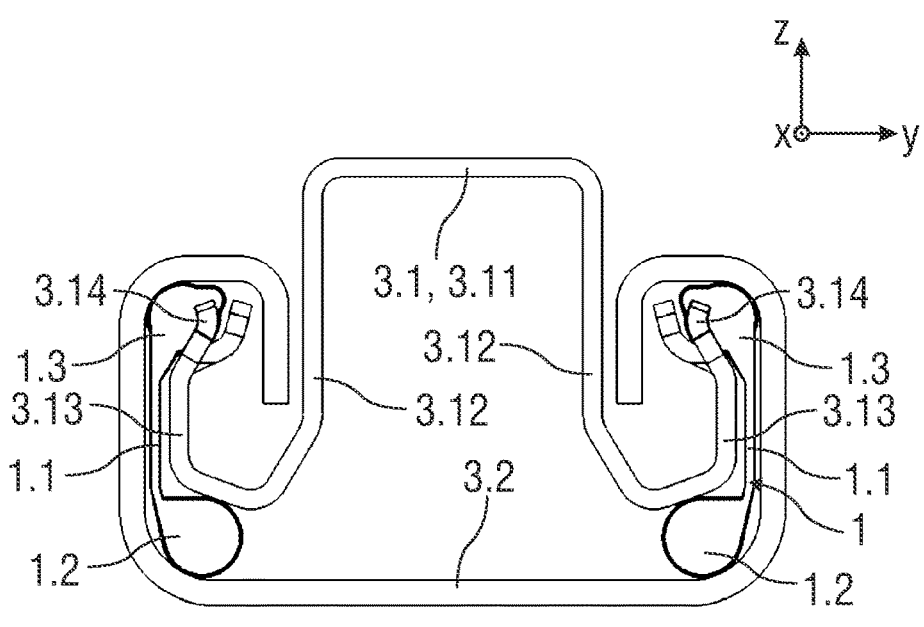
Figure 33:
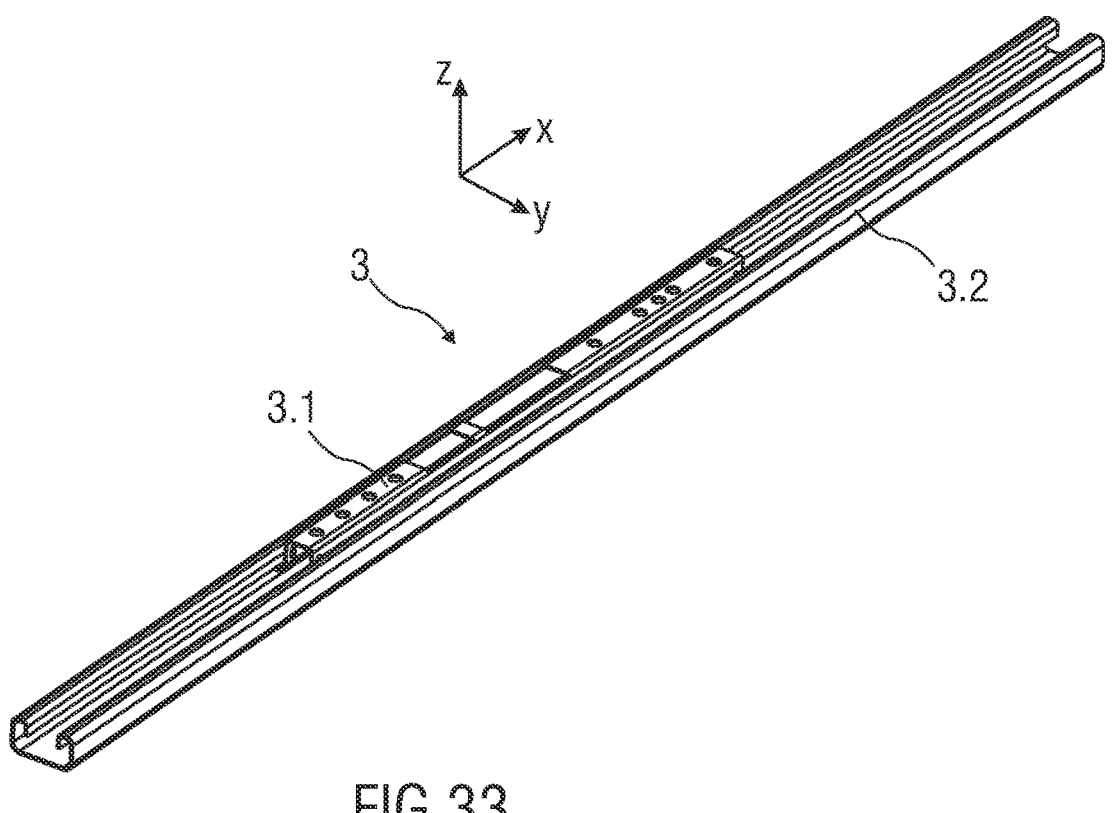

FIG. 23 shows a schematic illustration of a seat rail with upper and lower rail profiles with two sliding blocks arranged between the latter, FIG. 24 shows a schematic illustration of a longitudinal adjustment mechanism having a seat rail with upper and lower rail profiles with two sliding blocks arranged between the latter, and an actuating drive, FIG. 25 shows a schematic illustration of a longitudinal adjustment mechanism having a seat rail with upper and lower rail profiles with two sliding blocks arranged between the latter, and an actuating drive, FIG. 26 shows a schematic illustration of a longitudinal adjustment mechanism having a seat rail with upper and lower rail profiles with two sliding blocks arranged between the latter, and an actuating drive, FIG. 27 shows a schematic illustration of a longitudinal adjustment mechanism having a seat rail with upper and lower rail profiles with two sliding blocks arranged between the latter, and an actuating drive FIG. 28 shows a schematic illustration of a longitudinal adjustment mechanism having a seat rail with upper and lower rail profiles with two sliding blocks arranged between the latter, and an actuating drive, FIG. 29 shows a schematic illustration of a longitudinal adjustment mechanism having a seat rail with upper and lower rail profiles with two sliding blocks arranged between the latter, and an actuating drive, FIG. 30 shows a schematic illustration of a pair of seat rails rail with two sliding blocks, which are fixed or can be fixed on an upper rail profile, FIG. 31 shows a schematic illustration of a seat rail with two sliding blocks, which are fixed or can be fixed on an upper rail profile, FIG. 32 shows a schematic illustration of a seat rail with two sliding blocks, which are fixed or can be fixed on an upper rail profile, and FIG. 33 shows a schematic illustration of a seat rail with two sliding blocks, which are fixed or can be fixed on an upper rail profile.

DETAILED DESCRIPTION

In all the figures, mutually corresponding parts are provided with the same reference signs.

Figure 1:
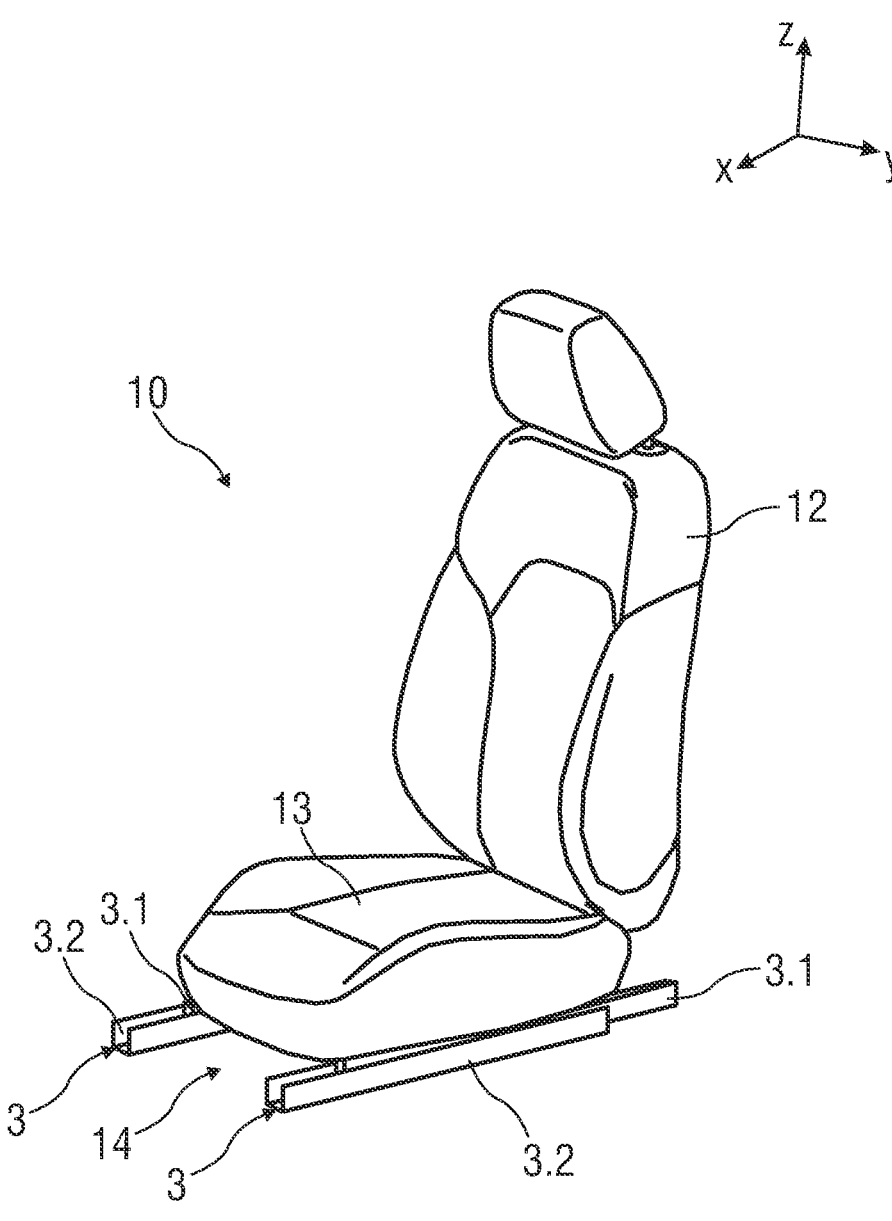
FIG. 1 shows in perspective an adjustable vehicle seat with a longitudinal adjuster.

A vehicle seat 10 illustrated schematically in FIG. 1 is described below using three spatial directions running perpendicularly to one another. In the case of a vehicle seat 10 installed in the vehicle, a longitudinal direction x runs largely horizontally and preferably parallel to a vehicle longitudinal direction, which corresponds to the usual direction of travel of the vehicle. A transverse direction y running perpendicularly to the longitudinal direction x is likewise aligned horizontally in the vehicle and runs parallel to a vehicle transverse direction. A vertical direction z runs perpendicularly to the longitudinal direction x and perpendicularly to the transverse direction y. In the case of a vehicle seat 10 installed in the vehicle, the vertical direction z runs parallel to the vehicle vertical axis.

The position indications and direction indications used, such as front, rear, top and bottom, refer to a direction of view of an occupant sitting in a vehicle seat 10 in a normal seat position, wherein, when installed in the vehicle, the vehicle seat 10 is in a position suitable for carrying people, with an upright backrest 12, which is aligned in the customary manner in the direction of travel. However, a vehicle seat 10 according to the invention can also be installed in a different alignment, e.g. transversely to the direction of travel.

The vehicle seat 10 has a seat part 13 and the backrest 12, the inclination of which relative to the seat part 13 is adjustable and which can be pivoted forward in the direction of the seat part 13.

For the longitudinally movable and longitudinally adjustable attachment of the vehicle seat 10 in the vehicle, the vehicle seat 10 has a longitudinal adjustment mechanism 14 (also referred to a longitudinal adjuster, for short).

The longitudinal adjustment mechanism 14 is used for longitudinal adjustment, i.e. adjustment of a longitudinal seat position, of the vehicle seat 10. For this purpose, the longitudinal adjustment mechanism 14 has a pair of seat rails 3 on each side of the vehicle seat. One pair of seat rails 3 is arranged on a tunnel side, and the other pair of seat rails 3 is arranged on a sill side of the vehicle. The two pairs of seat rails 3 of the longitudinal adjustment mechanism 14 run parallel to one another. Each pair of seat rails 3 has an upper rail profile 3.1 (also referred to as a seat real or upper rail) that can be connected to the vehicle seat 10, and a lower rail profile 3.2 (also referred to as a floor rail) that can be connected to a vehicle floor.

The seat rail or the upper rail profile 3.1 is guided in such a way that it can be moved relative to the lower rail profile 3.2 or floor rail 6 along the longitudinal direction x.

Figure 2:
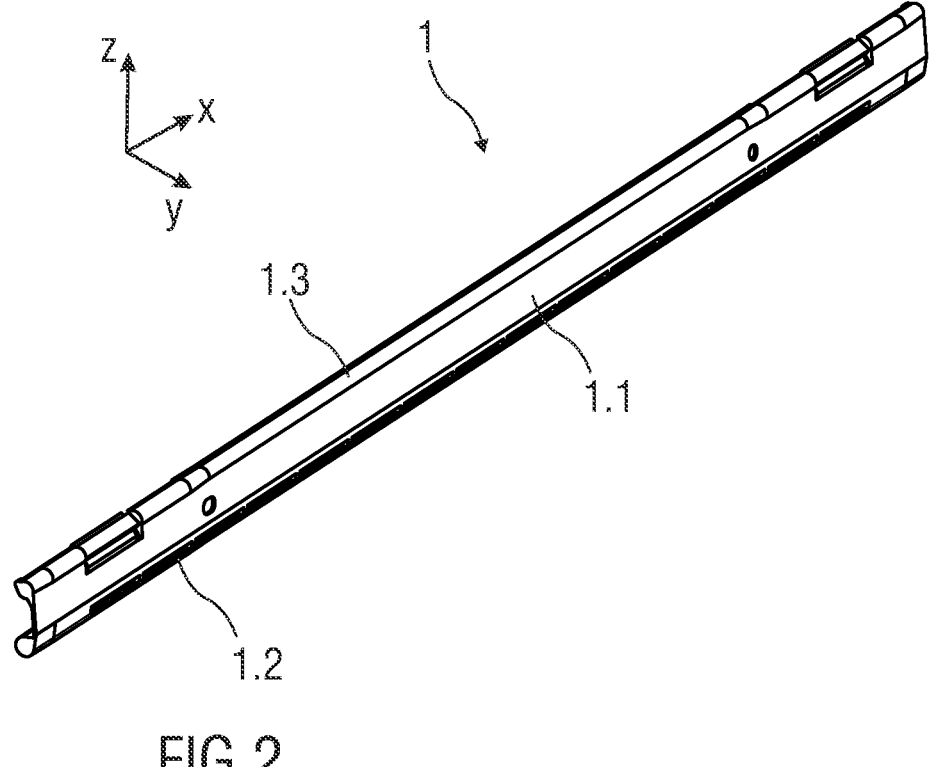
FIG. 2 shows a sliding block for a pair of seat rails schematically in perspective view.
Figure 3:
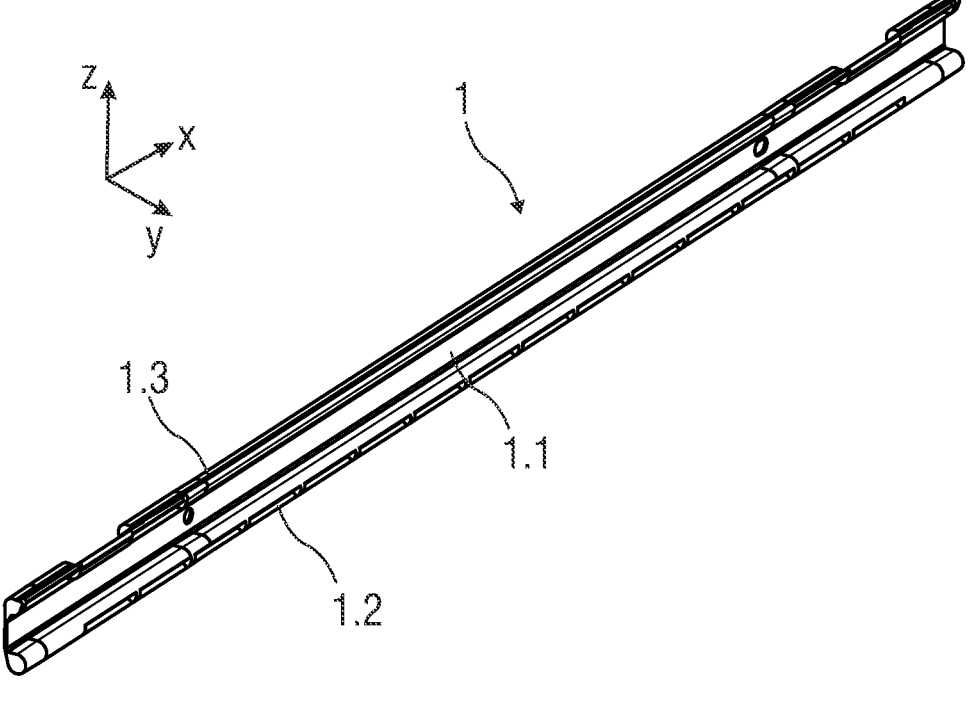
FIG. 3 shows a sliding block for a pair of seat rails schematically in perspective view.

FIGS. 2 and 3 each show a sliding block 1 in perspective illustration. Two sliding blocks 1 are provided for each pair of rails 3, as described in greater detail below.

The respective sliding block 1 comprises at least one base part 1.1.

The base part 1.1 extends substantially in the longitudinal direction x. The base part 1.1 comprises a lower sliding surface 1.2 and an upper sliding surface 1.3 in the vertical direction z.

The lower sliding surface 1.2 is of substantially rigid design. For example, the lower sliding surface 1.2 is designed as a solid-body region and/or in the form of a profile. The lower sliding surface 1.2 can be designed as a solid-body region or in the form of a profile in some region or regions. The lower sliding surface 1.2 extends largely over the entire length of the base part 1.1 in the longitudinal direction x. Moreover, the lower sliding surface 1.2 can be segmented and/or can have material recesses. In addition or as an alternative, the lower sliding surface 1.2 can have varying dimensions and/or shapes. For example, the lower sliding surface 1.2 can have dimensions that decrease, e.g. a decreasing diameter, along the longitudinal extent toward the center, starting from one longitudinal end, and can have increasing dimensions, e.g. an increasing diameter, from the center to an opposite longitudinal end. It is thereby possible to form a particularly light sliding block 1.

The upper sliding surface 1.3 is designed to differ in rigidity and/or flexibility from region to region.

The base part 1.1 and the lower and upper sliding surfaces 1.2, 1.3 are designed as one component, in particular as a shaped part, e.g. an injection molding made of plastic, and form an integral sliding body in the form of the sliding block 1. In particular, the integral sliding block 1 is formed from a low friction plastics material.

Sliding blocks 1 of this kind are designed without balls, and therefore plastic deformations are reliably avoided.

Figure 4:
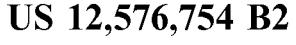
FIG. 4 shows a sliding block in schematic side view.

FIG. 4 shows one of the sliding blocks 1 in side view.

The lower sliding surface 1.2 can be of segmented design, for example. For example, the lower sliding surface 1.2 comprises a number of recesses 1.2.1, which are spaced apart. In this case, the segments of the lower sliding surface 1.2 have a greater length in the longitudinal direction x than the length of the recesses 1.2.1 between these segments. The recesses 1.2.1 serve to save material, thus making the sliding block 1 correspondingly lighter.

At least in the longitudinal end regions 1.3.1, the upper sliding surface 1.3 is designed to differ in rigidity and/or flexibility from region to region, and the lower sliding surface 1.2 is segmented along the longitudinal direction x and can have different shapes and/or dimensions, as shown by way of example for sliding sections G1 to G4 in FIGS. 5 to 8.

FIGS. 5 to 8 show the sectional views A-A, B-B, C-C and D-D of FIG. 4 in detail.

Figure 5:
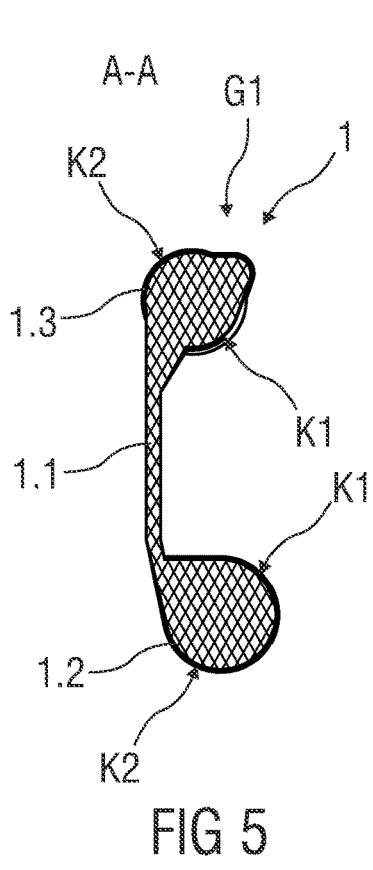
FIG. 5 shows a sectional illustration of the sliding block according to FIG. 2.

FIG. 5 shows, in sectional view A-A, a first sliding section G1 of the sliding block 1 with the lower and upper sliding surfaces 1.2 and 1.3 as solid-body regions, in particular substantially solid-circular regions, which are of substantially rigid design.

The base part 1.1 and the lower and upper sliding surfaces 1.2, 1.3 are manufactured from a single material, in particular a low friction plastic, e.g. polyoxymethylene (POM).

In this case, the lower sliding surface 1.2 is designed in such a way in all the sliding sections G1 to G4 that this lower sliding surface 1.2 always has two contact regions K1 and K2. The sliding section denoted as G1 is in each case an end section of the lower sliding surface 1.2. All the sliding sections G1 to G4 are of circular or spherical design in cross section.

In the first sliding section G1, the upper sliding surface 1.3 has two contact regions K1 and K2. The first sliding section G1 is an end section, which is of circular or spherical design in cross section in order to come into contact with retention tabs 3.14 formed on the upper rail profile 3.1, and/or to be supported on these, as shown in FIGS. 30 to 32.

The upper sliding surface 1.3 has, in a manner alternating along its longitudinal extent, a contact region K1 (third sliding section G3; FIG. 7) or K2 (second sliding section G2, FIG. 6), two contact regions K1, K2 (first sliding section G1, FIG. 5), or no contact region K1, K2 (fourth sliding section G4, FIG. 8).

Figure 6:
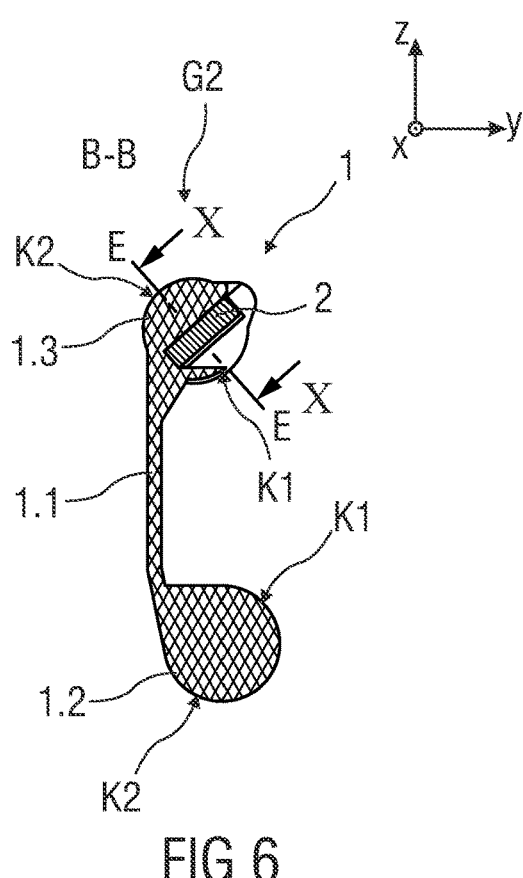
FIG. 6 shows a sectional illustration of the sliding block according to FIG. 2.
Figure 7:
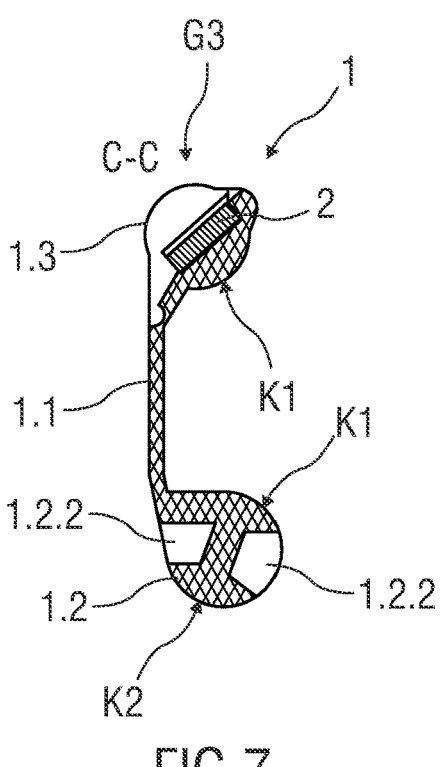
FIG. 7 shows a sectional illustration of the sliding block according to FIG. 2.

FIG. 6 shows, in sectional view B-B, a second sliding section G2 of the sliding block 1 with lower and upper sliding surfaces 1.2, 1.3 of different designs.

The lower sliding surface 1.2 is designed as a solid-body region, in particular a substantially solid-circular region, which is substantially rigid. The lower sliding surface 1.2 has two contact regions K1, K2.

The upper sliding surface 1.3 is designed partially as a solid-body region, in particular as a semicircular region. As a result, the upper sliding surface 1.3 has a lower rigidity and is of correspondingly flexible, in particular mobile or elastic, design.

The base part 1.1 and the lower and upper sliding surfaces 1.2, 1.3 are manufactured from a single material, in particular a low friction plastic.

In this second sliding section G2, the upper sliding surface 1.3 is additionally provided with at least one spring element 2. The spring element 2 is arranged below the upper sliding surface 1.3, for example. The outer upper sliding surface 1.3 made of plastic forms an outer contact region K2.

The spring element 2 is formed and arranged below the upper sliding surface 1.3 in order to provide an outwardly directed preloading force. It is thereby possible to ensure a sufficiently large preload on this less rigid, in particular flexible, sliding region, even over the service life and during temperature fluctuations, for adequate contacting of the outer contact region K2.

The spring element 2 can be formed from a spring steel wire or a spring steel sheet, for example, in particular a flat strip of spring steel sheet. The spring element 2 extends over the entire second sliding section G2 or else only over some region or regions of this second sliding section G2 in the upper sliding surface 1.3.

FIG. 7 shows, in sectional view C-C, a third sliding section G3 of the sliding block 1 with lower and upper sliding surfaces 1.2, 1.3 of different designs.

The lower sliding surface 1.2 is designed as a profile region with material recesses 1.2.2, in particular a substantially H shaped profile. Alternatively, the lower sliding surface 1.2 can have other shapes and/or dimensions that save material. For example, the lower sliding surface 1.2 can alternatively have a smaller diameter in the third sliding section G3 than in the first and second sliding sections G1 and G2.

The upper sliding surface 1.3 is designed partially as a solid-profile region, in particular as a semicircular region. As a result, the upper sliding surface 1.3 has a lower rigidity and is of correspondingly flexible, in particular mobile or elastic, design.

The base part 1.1 and the lower and upper sliding surfaces 1.2, 1.3 are manufactured from a single material, in particular a low friction plastic.

In this third sliding section G3, the upper sliding surface 1.3 is additionally provided with at least one spring element 2. The spring element 2 is arranged above the upper sliding surface 1.3, for example. The inner upper sliding surface 1.3 made of plastic forms an inner contact region K1.

The spring element 2 is designed and arranged above the upper sliding surface 1.3 in order to provide an inwardly directed preloading force. It is thereby possible to ensure a sufficiently large preload on this less rigid, in particular flexible, sliding region, even over the service life and during temperature fluctuations, for adequate contacting of the inner contact region K1.

The spring element 2 can be formed from a spring steel wire or a spring steel sheet, for example, in particular a flat strip of spring steel sheet. The spring element 2 extends over the entire third sliding section G3 or else only over some region or regions of this third sliding section G3 in the upper sliding surface 1.3.

Figure 8:
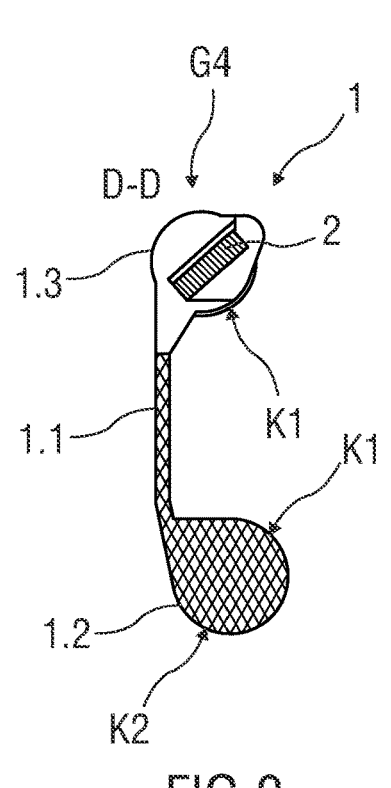
FIG. 8 shows a sectional illustration of the sliding block according to FIG. 2.

FIG. 8 shows, in sectional view D-D, a fourth sliding section G4 of the sliding block 1 with lower and upper sliding surfaces 1.2, 1.3 of different designs.

The lower sliding surface 1.2 is designed as a solid-body region, in particular a substantially solid-circular region, which is substantially rigid.

The upper sliding surface 1.3 is designed partially as a profile region, in particular an I-shaped region. As a result, the upper sliding surface 1.3 has a lower rigidity and is of correspondingly flexible, in particular mobile or elastic, design.

The base part 1.1 and the lower and upper sliding surfaces 1.2, 1.3 are manufactured from a single material, in particular low friction plastic.

In this fourth sliding section G4, the upper sliding surface 1.3 is additionally provided with at least one additional spring element 2. It is thereby possible to ensure the preloading of this less rigid, in particular flexible, sliding region even over the service life and during temperature fluctuations. The spring element 2 can be formed from a spring steel wire or a spring steel sheet, for example, in particular a flat strip of spring steel sheet. The spring element 2 extends over the fourth sliding section G4 in the upper sliding surface 1.3.

Figure 9:
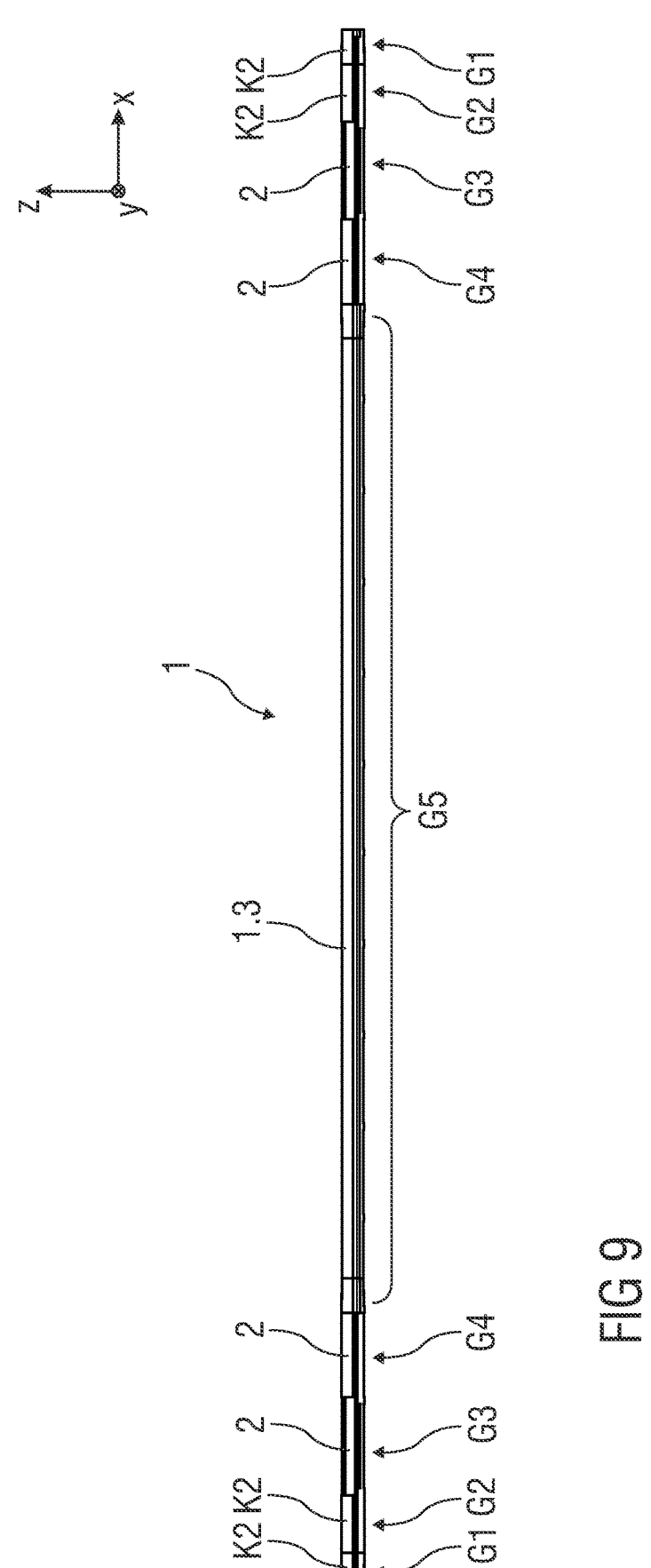
FIG. 9 shows a sliding block schematically in a plan view from above.

FIG. 9 shows the sliding block 1 with the four sliding sections G1 to G4 of the upper sliding surface 1.3 in a plan view from above. In this case, the sliding sections G1 to G4 are each provided at the ends of the sliding block 1. In particular, there is the first sliding section G1 at the outer ends of the sliding block 1, with two contact regions K1 and K2 in each of the lower and upper sliding surfaces 1.2 and 1.3, as shown in FIG. 5.

A central sliding section G5 serves purely for support and spacing. This central sliding section G5 can have contact regions K1, K2; alternatively, it can also be configured to be contactless in some region or regions. The outermost first sliding sections G1 serve for reliable contacting and therefore have full surface areas and correspondingly large dimensions and shapes. The second to fourth sliding sections G2 to G4, which are arranged between the first sliding sections G1 and the central sliding section G5, can have decreasing dimensions, shapes and/or half or profile-shaped surface areas. In addition, the third and fourth sliding sections G3, G4 are provided with at least one spring element 2 or a plurality of spring elements 2 to provide a preload, for example. The spring element 2 can extend over a plurality of sliding sections G3, G4. The spring element 2 is a spring wire or a spring steel sheet, for example.

Figure 10:
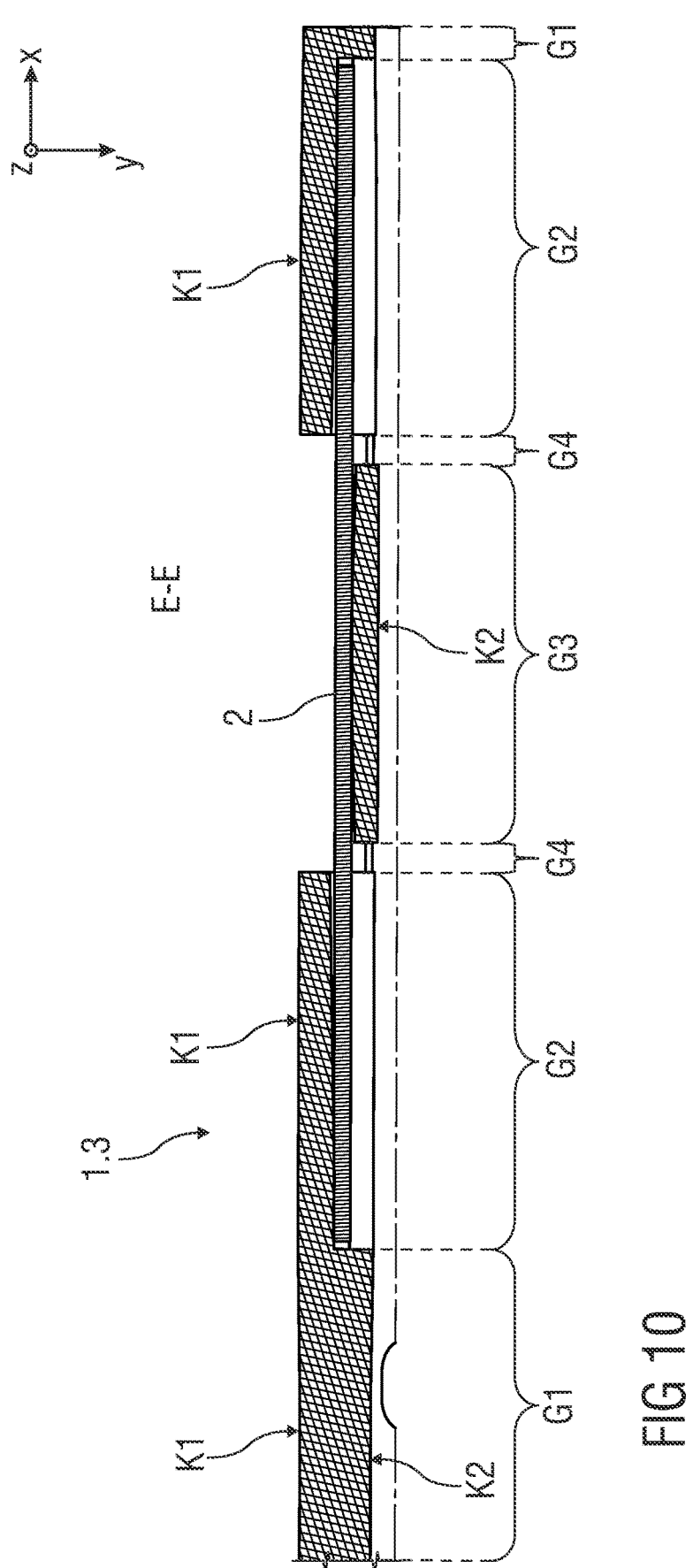
FIG. 10 shows a schematic sectional illustration through an upper sliding region of a sliding block.

FIG. 10 shows a schematic sectional illustration E-E through an upper sliding surface 1.3 with various sliding sections G1 to G5 of one of the sliding blocks 1. At the ends, the sliding block 1 has respective first sliding sections G1 with solid profiles and without a spring steel sheet to provide two contact regions K1, K2—an inner contact region K1 and an outer contact region K2. Toward the inside, there is in each case an adjoining second sliding section G2 with an inner contact region K1. Adjoining each of these inner second sliding sections G2 there is a fourth sliding section G4 without contacts. Arranged between these fourth sliding sections G4 is a third sliding section G3 with an outer contact region K2.

The spring element 2 can extend over the entire length of the second, third and fourth sliding sections G2 to G4. The plastics material of the sliding block 1, in particular the solid-body region or profile region of the upper sliding surface 1.3, can be arranged in an alternating manner on different sides of the spring element 2, in particular above and/or below the spring element 2, along the spring element 2. By means of such an alternating arrangement of the plastics material in relation to the spring element 2, an inner contact region K1 and an outer contact region K2 and/or two contact regions K1 and K2 are formed in an alternating manner.

Figure 11:
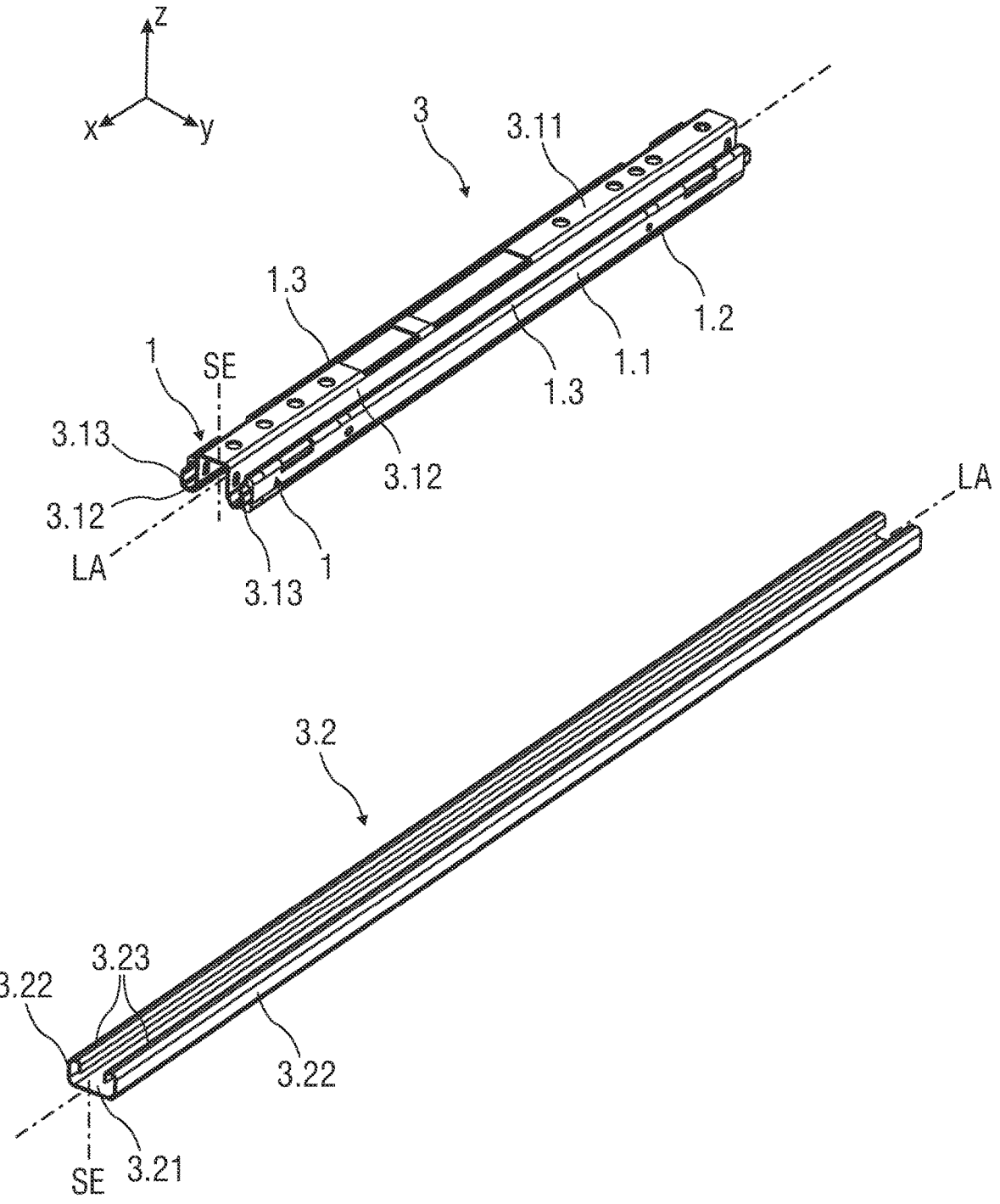
FIG. 11 shows schematically an exploded view of a pair of seat rails with two rail profiles and two sliding blocks arranged between the latter.

FIG. 11 shows a pair of seat rails 3 in an exploded view.

The pair of seat rails 3 comprises an upper rail profile 3.1 and a lower rail profile 3.2. The two rail profiles 3.1 and 3.2 are coupled movably to one another via two sliding blocks 1 of the kind described by way of example above with reference to FIGS. 2 to 10.

In the exemplary embodiment shown, the upper rail profile 3.1 can be moved longitudinally relative to the lower rail profile 3.2 by means of the sliding blocks 1 and is adjustable in the longitudinal direction x.

In a first embodiment, the length of the respective sliding block 1 can extend along the total length of the upper rail profile 3.1. Alternatively, the respective sliding block 1 can be designed to be shorter than the upper rail profile 3.1.

In the case of its being formed over the entire length of the upper rail profile 3.1, the respective sliding block 1 is fixed relative to the upper rail profile 3.1. For this purpose, the respective sliding block 1 is fastened or fixed on the upper rail profile 3.1 and can be moved, in particular adjusted longitudinally, together with the latter relative to the lower rail profile 3.2.

Such an embodiment has a large supporting length, wherein the lower rail profile 3.2 also surrounds the upper rail profile 3.1 in the forwardmost and rearmost longitudinal set profile.

The pair of seat rails 3 is embodied in such a way as to be at least approximately plane-symmetrical with respect to a plane of symmetry SE which contains a longitudinal axis LA and is perpendicular to the plane of the drawing of FIG. 2.

The lower rail profile 3.2 has a lower rail bottom 3.21 and, on each side of the plane of symmetry SE, a lower rail flank 3.22 at an angle to the lower rail bottom 3.21, and a lower rail end section 3.23, which is angled inward from the lower rail flank 3.22, i.e. toward the plane of symmetry SE, and rearward, i.e. toward the lower rail bottom 3.21.

The upper rail profile 3.1 has an upper rail middle section 3.11 and, on each side of the plane of symmetry SE, an upper rail flank 3.12 at an angle to the upper rail middle section 3.11, and an upper rail end section 3.13, which is angled outward from the upper rail flank 3.12, i.e. away from the plane of symmetry SE, and upward, i.e. away from the lower rail bottom 3.21. The upper rail middle section 3.11 runs parallel to the lower rail bottom 3.21 above the lower rail profile 3.2. Each upper rail flank 3.12 has a region which runs between the lower rail end sections 3.23. Each upper rail end section 3.13 projects into a spatial region which lies between a lower rail flank 3.22 and the lower rail end section 3.23 at an angle to the latter.

The upper rail profile 3.1 and the lower rail profile 3.2 are each manufactured from a metallic material, for example.

The sliding blocks 1 described in detail above with reference to FIGS. 2 to 10 are placed laterally against the two outer upper rail end sections 3.13. During the assembly of the pair of seat rails 3, the upper rail profile 3.1, with the laterally applied sliding blocks 1, and the lower rail profile 3.2 are inserted one into the other and pushed together.

Owing to the differing rigidity and/or elasticity of the upper sliding surface 1.3, the sliding block 1 can make contact with the upper rail profile 3.1 or the lower rail profile 3.2 in some region or regions, in particular in an alternating manner or alternately, in an upper track LO of the pair of seat rails 3 (said track being illustrated in greater detail in FIGS. 18 to 20), as shown below by means of the various examples in FIGS. 12 to 29. By virtue of the alternation of the contact regions K1, K2, these can be embodied so as to be elastic and spring-preloaded. It is thereby possible to compensate for tolerances.

FIGS. 12 to 17 show various schematic illustrations of an upper rail profile 3.1 with laterally arranged sliding blocks 1.

Figure 12:
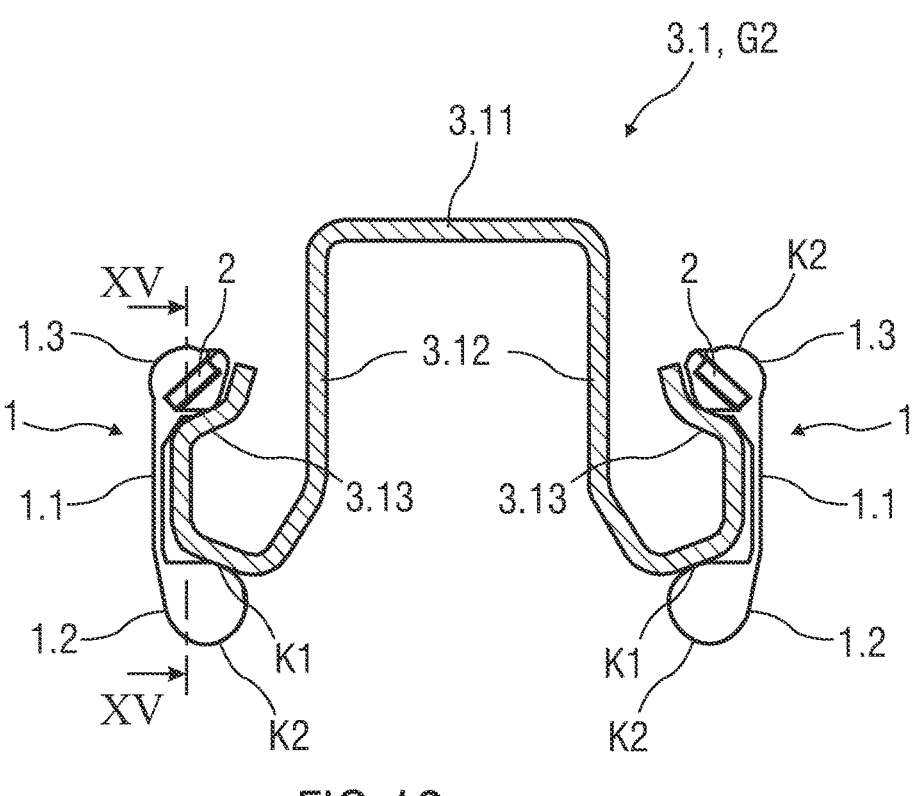
FIG. 12 shows a schematic illustration of an upper rail profile with laterally arranged sliding blocks.
Figure 13:
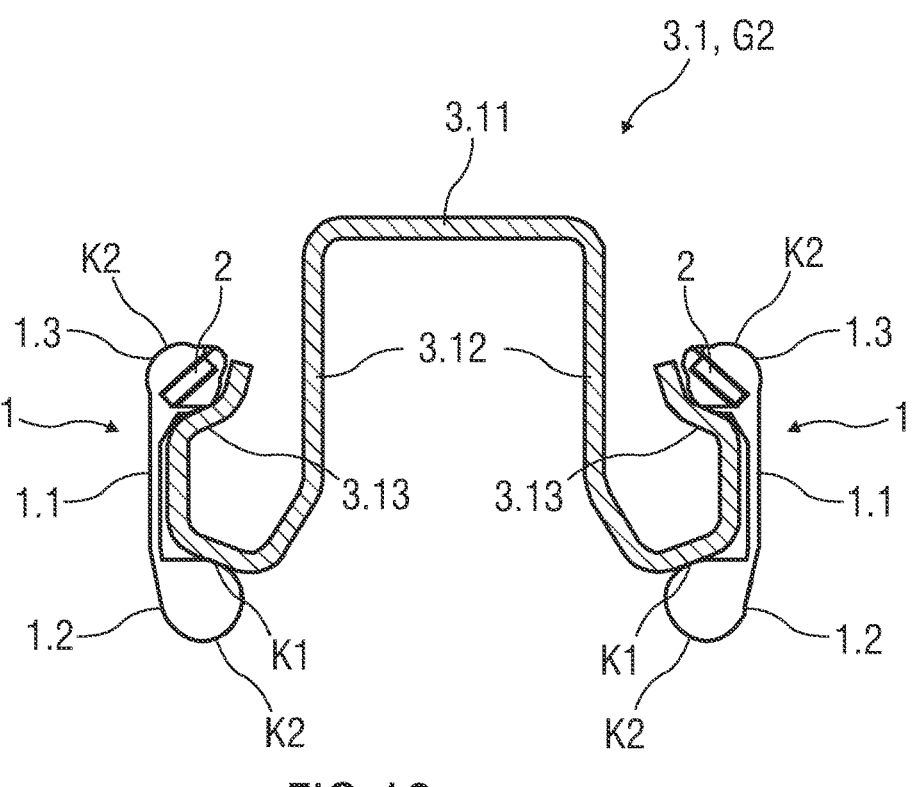
FIG. 13 shows a schematic illustration of an upper rail profile with laterally arranged sliding blocks.
Figure 14:
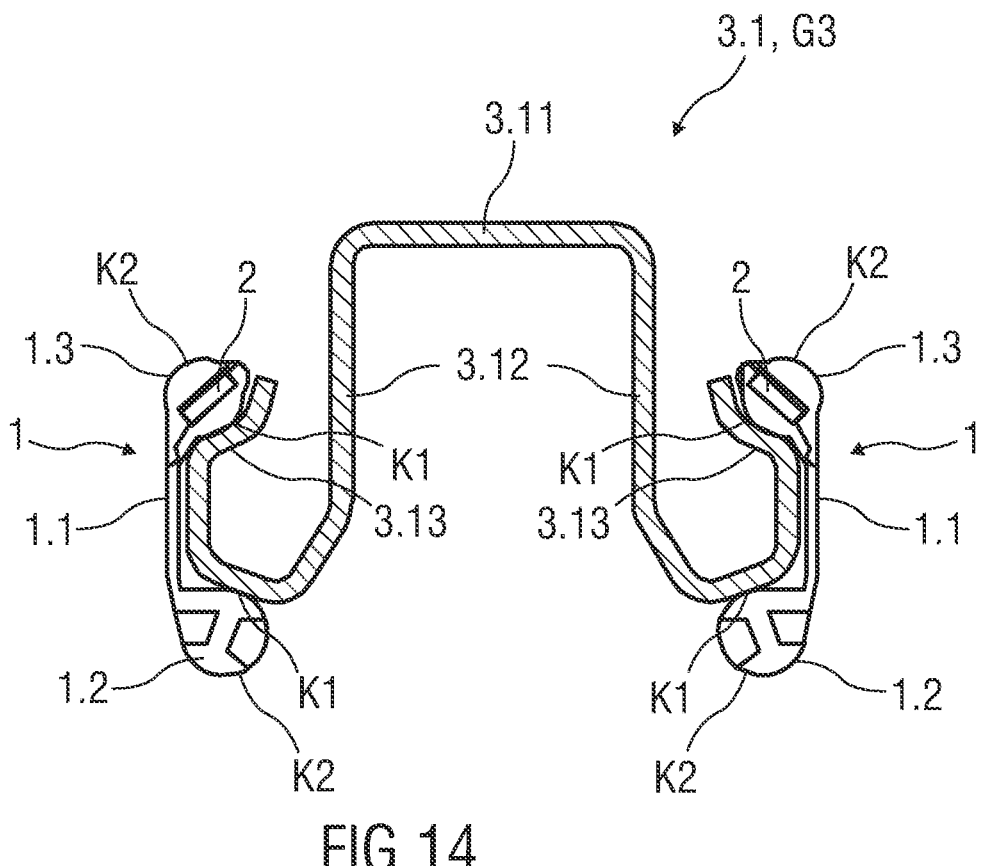
FIG. 14 shows a schematic illustration of an upper rail profile with laterally arranged sliding blocks.

FIGS. 12 to 14 show sectional illustrations of various sliding sections G2 and G3 of the sliding blocks 1, which are arranged laterally on the upper rail profile 3.1. In the sliding sections G2 and G3, the lower sliding surface 1.2 of the sliding block 1 always has an inner contact region K1 with respect to the upper rail profile 3.1. In contrast, the upper sliding surface 1.3 has an inner contact region K1 with respect to the upper rail profile 3.1 only in the third sliding section G3. In the second sliding section G2, the upper sliding surface 1.3 has only an outer contact region K2 with respect to the lower rail profile 3.2, as illustrated in FIGS. 18 and 19.

Figure 15:
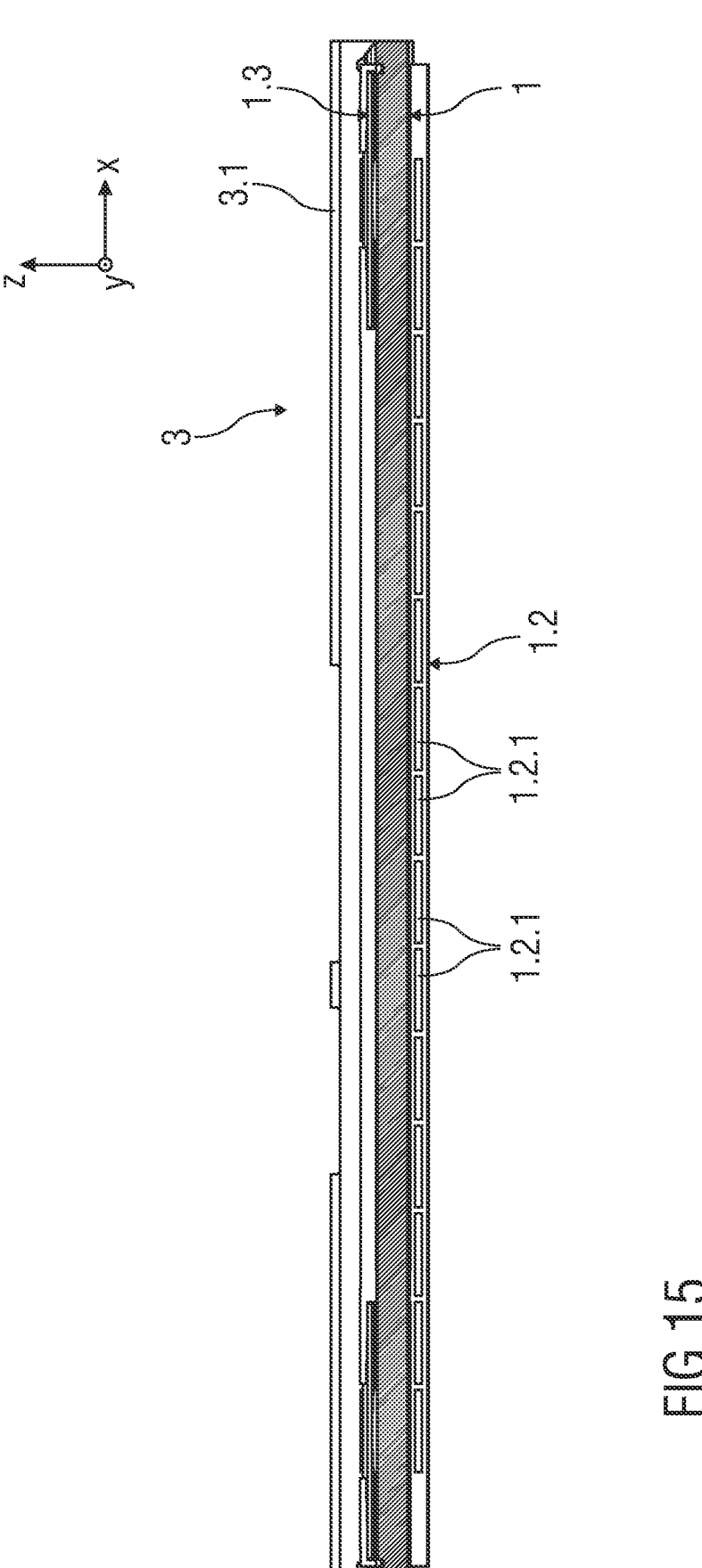
FIG. 15 shows a schematic illustration of an upper rail profile with laterally arranged sliding blocks.
Figure 16:
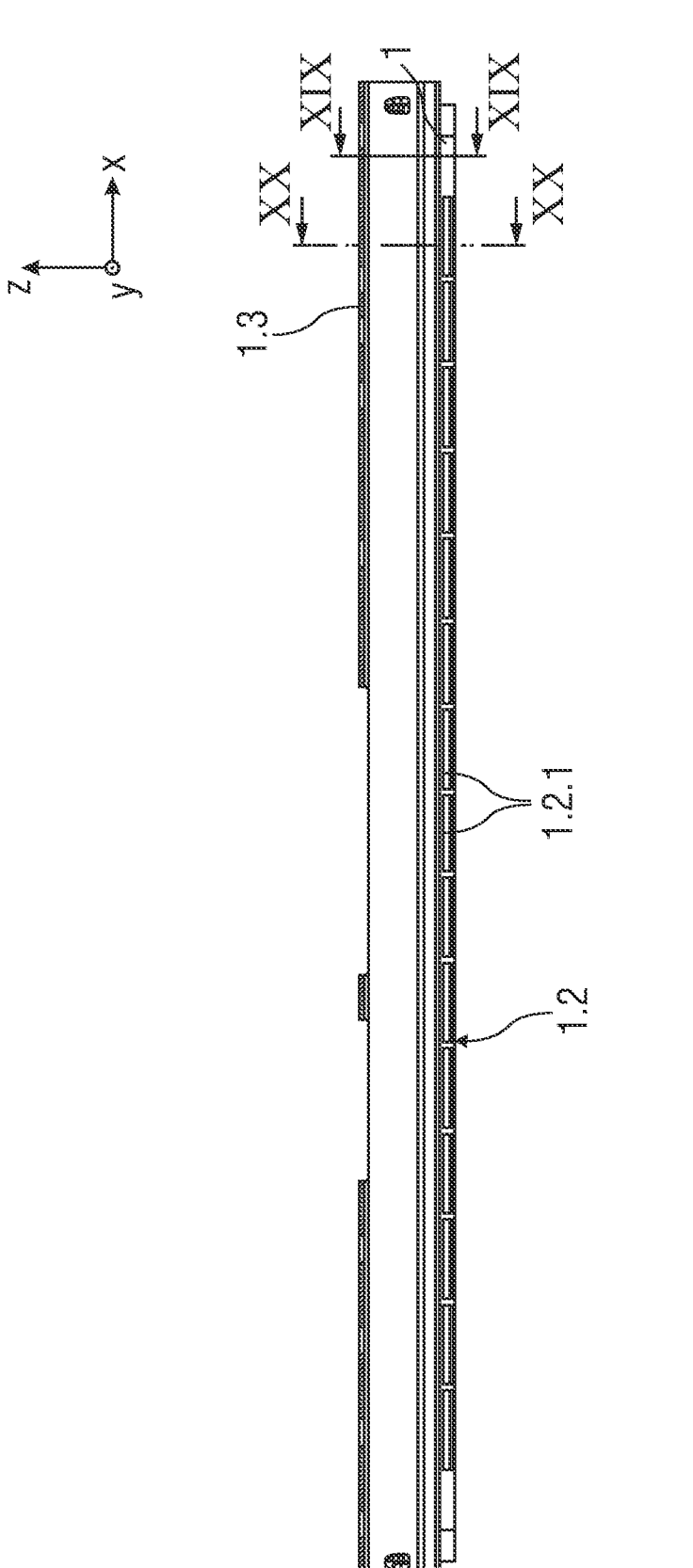
FIG. 16 shows a schematic illustration of an upper rail profile with laterally arranged sliding blocks.
Figure 17:
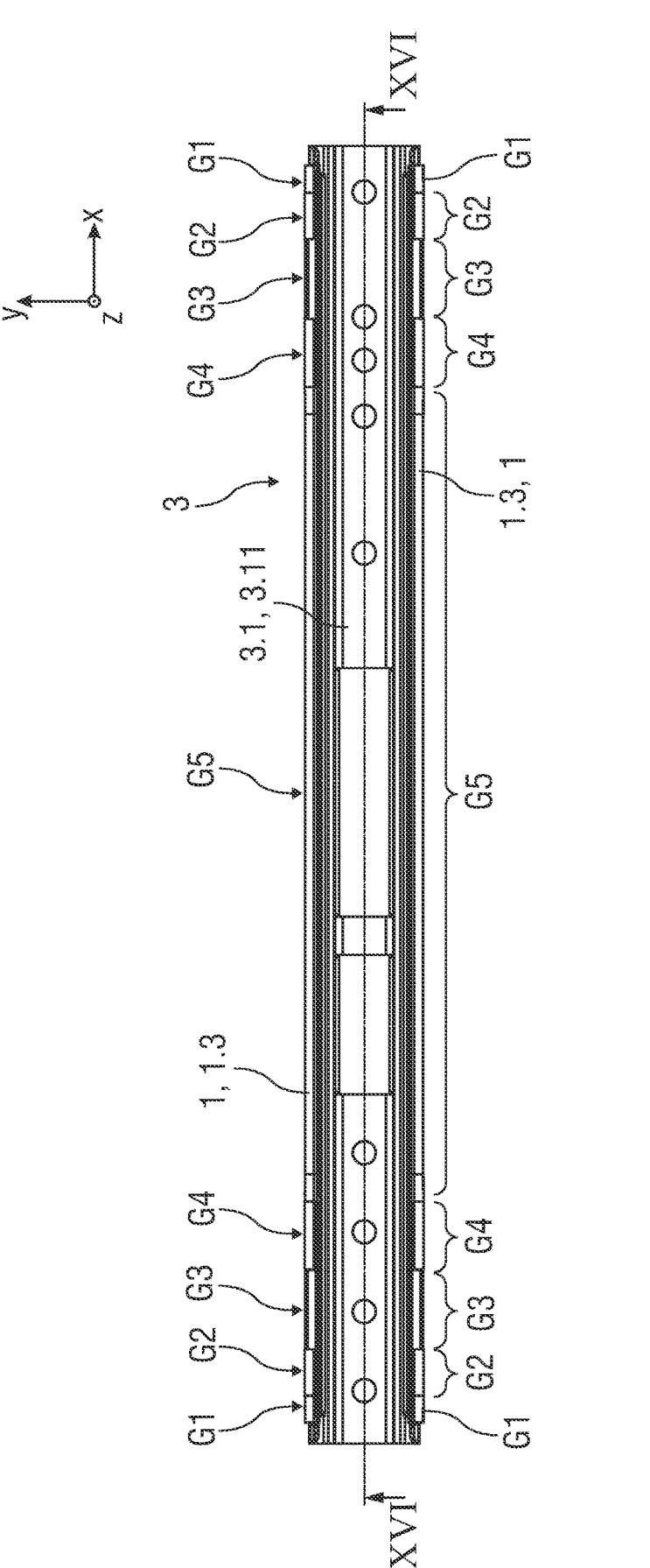
FIG. 17 shows a schematic illustration of an upper rail profile with laterally arranged sliding blocks.

FIGS. 15 to 17 show the upper rail profile 3.1 with the laterally arranged sliding blocks 1 and the various sliding sections G1 to G5 in longitudinal section, in side view and in plan view from above of the upper rail middle section 3.11.

Figure 18:
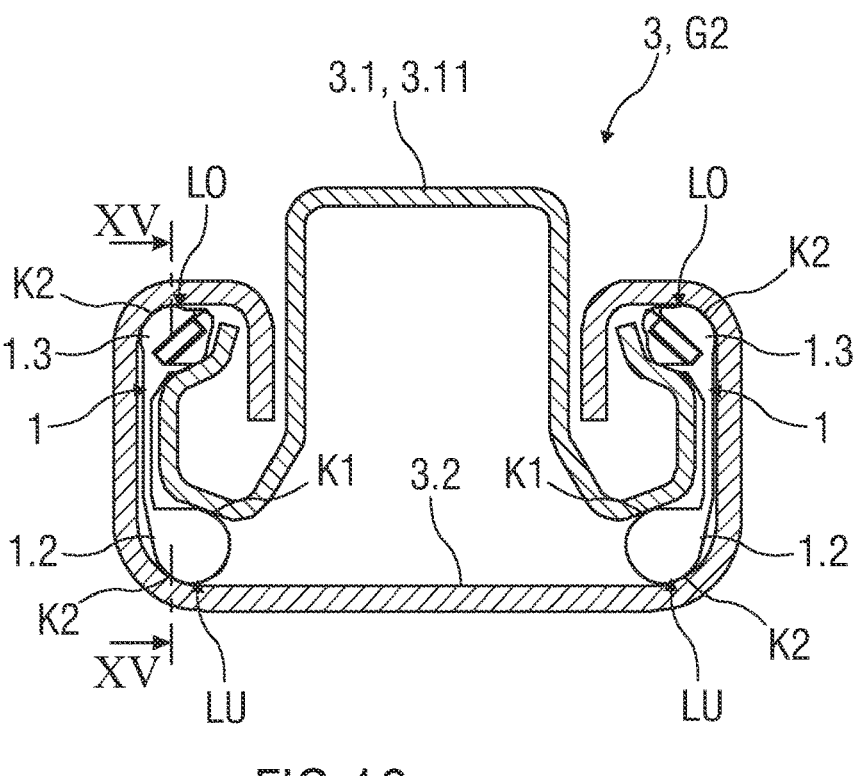
FIG. 18 show shows a schematic illustration of a pair of seat rail with upper and lower rail profiles with two sliding blocks arranged between the latter.
Figure 19:
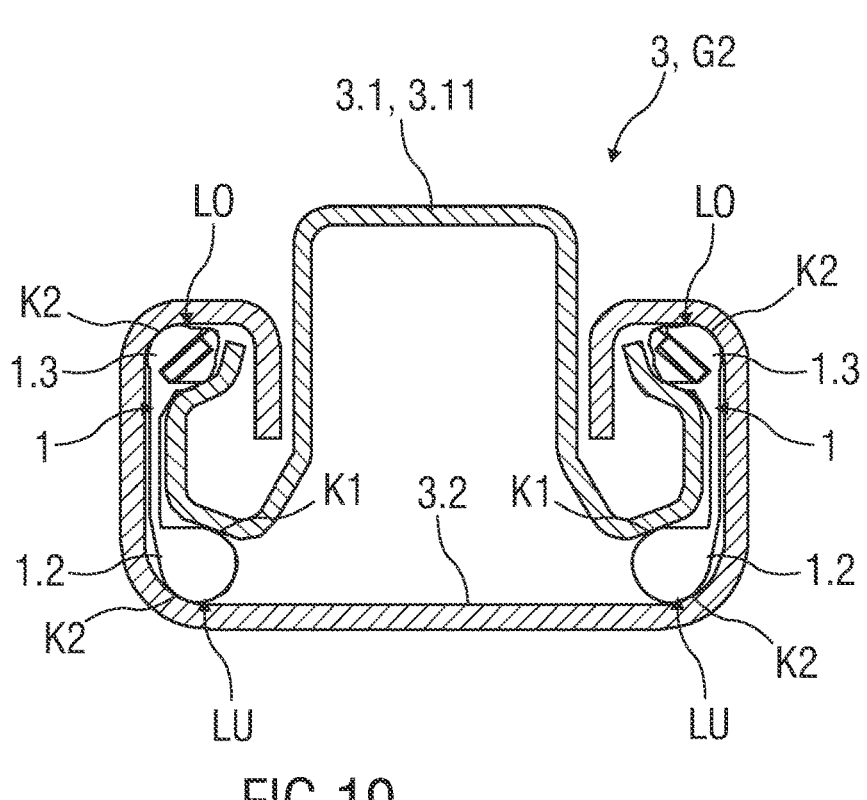
FIG. 19 shows a schematic illustration of a seat rail with upper and lower rail profiles with two sliding blocks arranged between the latter.
Figure 20:
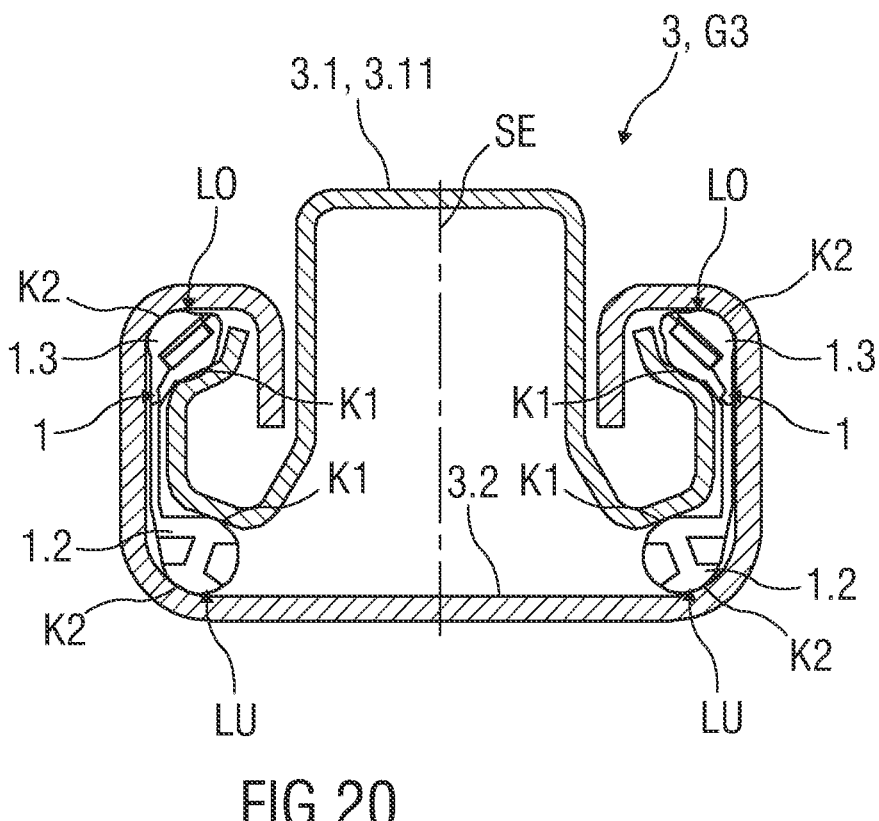
FIG. 20 shows a schematic illustration of a seat rail with upper and lower rail profiles with two sliding blocks arranged between the latter
Figure 21:
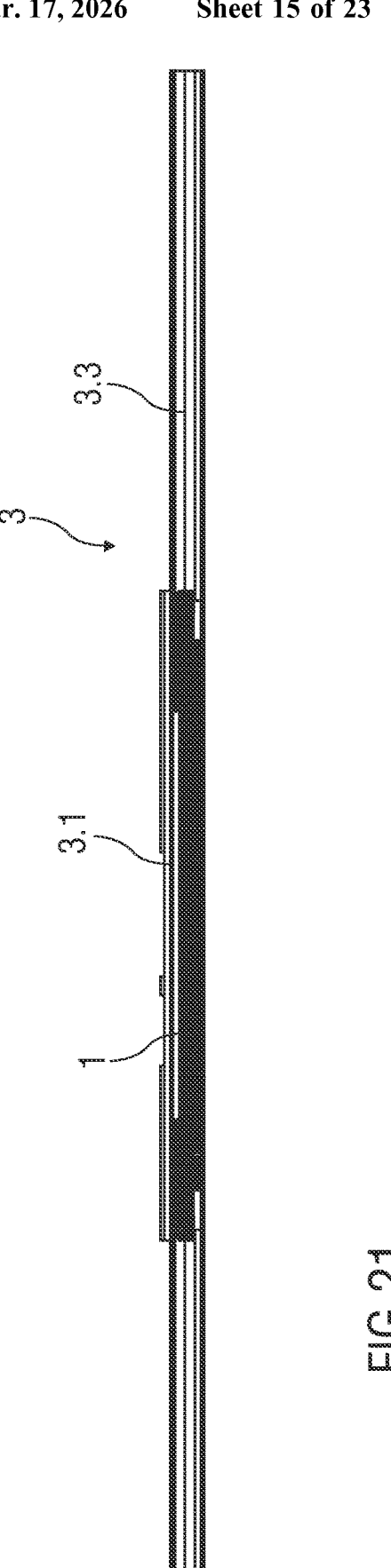
FIG. 21 shows a schematic illustration of a seat rail with upper and lower rail profiles with two sliding blocks arranged between the latter.
Figure 22:
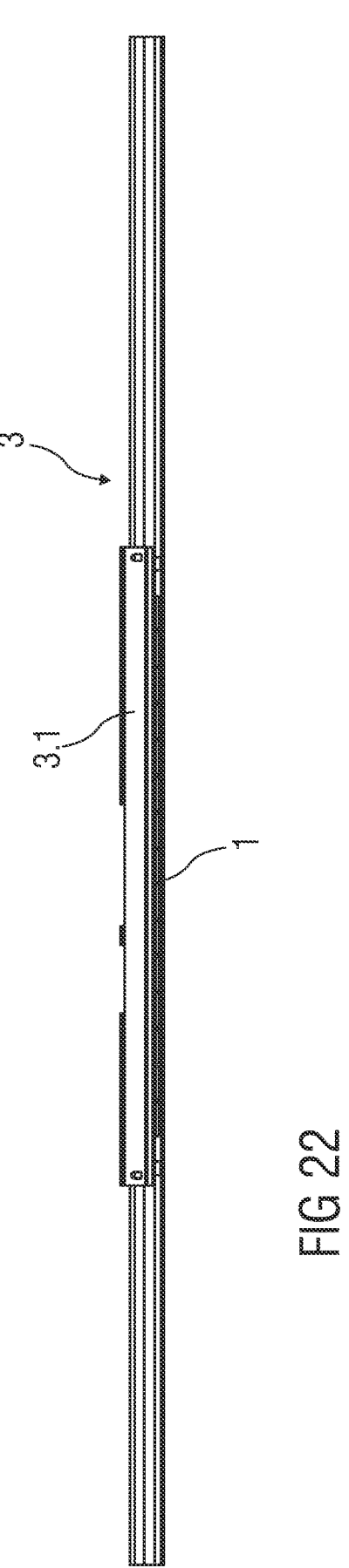
FIG. 22 shows a schematic illustration of a seat rail with upper and lower rail profiles with two sliding blocks arranged between the latter.

FIGS. 18 to 23 show various schematic illustrations of a pair of seat rails 3 having upper and lower rail profiles 3.1, 3.2 with two sliding blocks 1 arranged between them, in the installed state, in various cross sections as per FIGS. 18 to 20, and in longitudinal section, in side view and in plan view from above of the upper rail middle section 3.11 as per FIGS. 21, 22 and 23, respectively.

In the second sliding section G2 as per FIGS. 18 and 19, the two sliding blocks 1 are in contact both by means of the lower sliding surface 1.2 and the upper sliding surface 1.3, via outer contact regions K2, with the lower rail profile 3.2 in an upper track LO and a lower track LU. In this case, the upper sliding surfaces 1.3 are of spring-preloaded design in order to provide the outer contact regions K2 with the lower rail profile 3.2. For this purpose, the spring element 2 is arranged below the upper sliding surface 1.3. The sliding blocks 1 make contact with the upper rail profile 3.1 only by means of their lower sliding surfaces 1.2, via the inner contact regions K1.

In the third sliding section G3 as per FIG. 20, the two sliding blocks 1 are in contact both by means of the lower sliding surface 1.2 and the upper sliding surface 1.3, via inner contact regions K1, with the upper rail profile 3.1 in the upper track LO and the lower track LU. In this case, the upper sliding surfaces 1.3 are of spring-preloaded design in order to provide the inner contact regions K1 with the upper rail profile 3.1. For this purpose, the spring element 2 is arranged above the upper sliding surface 1.3. The sliding blocks 1 make contact with the lower rail profile 3.2 only by means of their lower sliding surfaces 1.2, via the outer contact regions K2.

FIGS. 21 to 23 show an exemplary embodiment which has a shorter upper rail profile 3.1 in comparison with the longer lower rail profile 3.2.

FIGS. 24 to 29 show various schematic illustrations of a longitudinal adjustment mechanism 4 having a pair of seat rails 3 with upper and lower rail profiles 3.1, 3.2 with two sliding blocks 1 arranged between the latter, and an actuating drive 5.

FIGS. 30 to 33 show various schematic illustrations of an upper rail profile 3.1 and of a pair of seat rails 3 with two sliding blocks 1, which are fixed or can be fixed on the upper rail profile 3.1.

For this purpose, the upper rail profile 3.1 has at its ends, in particular on its end faces, outwardly directed retention tabs 3.14, with which the upper sliding surfaces 1.3 of the sliding blocks 1 enter into stop contact in the longitudinal direction x. In this case, each upper rail end section 3.13 has an outwardly directed retention tab 3.14 at both longitudinal ends when viewed in the longitudinal direction x, and therefore each sliding block 1 is fixed laterally on the respective upper rail end section 3.13 between the two retention tabs 3.14 in the longitudinal direction x.

If the sliding block 1 is shorter than the upper rail profile 3.1, a relative movement can likewise take place with respect to the upper rail profile 3.1. This enables the length of the lower rail profile 3.2 to be made shorter since the upper rail profile 3.1 can move out of the lower rail profile 3.2.

The alternate contact regions K1, K2 can furthermore have insertion bevels in order to allow simple assembly of the pair of seat rails 3.

LIST OF REFERENCE SIGNS 1 sliding block
1.1 base part
1.2 lower sliding surface
1.2.1 recess
1.2.2 material recess
1.3 upper sliding surface
1.3.1 longitudinal end region
2 spring element
3 pair of seat rails
3.1 upper rail profile
3.11 upper rail middle section
3.12 upper rail flank
3.13 upper rail end section
3.14 retention tab
3.2 lower rail profile
3.21 lower rail bottom
3.22 lower rail flank
3.23 lower rail end section
4 longitudinal adjustment mechanism
5 actuating drive
10 vehicle seat
12 backrest
13 seat part
14 longitudinal adjustment mechanism
A-A, B-B, C-C, D-D, E-E sectional view
G1, G2, G3, G4 sliding section
G5 central sliding section
K1 inner contact region
K2 outer contact region
LA longitudinal axis
LO upper track
LU lower track
SE plane of symmetry
x longitudinal direction
y transverse direction
z vertical direction

The invention claimed is:

1. A sliding block for a pair of rail of a longitudinal adjustment mechanism, comprising at least one base part, which has a lower sliding surface and an upper sliding surface, wherein at least the upper sliding surface has an upwardly directed contact region and a downwardly directed contact region respectively alternating along a longitudinal extent of the upper sliding surface, wherein the contact regions are arranged at different longitudinal positions along the longitudinal extent of the upper sliding surface.

2. The sliding block as claimed in claim 1, wherein one of the sliding surfaces is of rigid design and the other sliding surface is designed to differ in rigidity or flexibility from region to region.

3. The sliding block as claimed in claim 1, wherein the base part and the sliding surfaces are designed as an integral sliding body.

4. The sliding block as claimed in claim 1, wherein the lower sliding surface is designed, at least in some region or regions, as a solid body region or in the form of a profile.

5. The sliding block as claimed in claim 1, wherein the lower sliding surface is of segmented design and comprises a number of mutually spaced recesses.

6. The sliding block as claimed in claim 1, wherein the lower sliding surface has two contact regions, at least in a first sliding section.

7. The sliding block as claimed in claim 1, wherein the upper sliding surface comprises a substantially semicircular sliding section, at least in some region or regions.

8. The sliding block as claimed in claim 1, wherein the upper sliding surface is provided with at least one spring element, at least in some region or regions.

9. A pair of rails for a longitudinal adjustment mechanism, comprising at least two rail profiles and at least one sliding block, which comprises at least one base part, which has a lower sliding surface and an upper sliding surface, wherein one of the sliding surfaces has, along its longitudinal extent, contact regions, which are arranged in an alternating manner, are each assigned to one of the two rail profiles, and contact one of the two rail profiles, wherein the contact regions are arranged at different longitudinal positions along the longitudinal extent of the upper sliding surface.

10. The pair of rails as claimed in claim 9, wherein one of the rail profiles is coupled movably via the sliding block to the other rail profile and can be adjusted relative to the other rail profile, wherein the sliding surfaces are each arranged in an upper track and a lower track.

11. The pair of rails as claimed in claim 9, wherein the lower sliding surface has two contact regions, which each contact one of the two rail profiles.

12. A vehicle seat, comprising two pairs of rails as claimed in claim 9.

* * * * *